US010274590B2

United States Patent
(12) United States Patent
Kuo et al.

(10) Patent No.: US 10,274,590 B2
(45) **Date of Patent: *Apr. 30, 2019**

(54) ULTRASONIC IMAGING WITH ACOUSTIC RESONANT CAVITY

(71) Applicant: QUALCOMM Incorporated, San Diego, CA (US)

(72) Inventors: Nai-Kuei Kuo, Los Gatos, CA (US); Kostadin Dimitrov Djordjev, Los Gatos, CA (US); Ranjith Ranganathan, San Jose, CA (US); Nao Sugawara Chuei, San Mateo, CA (US); Ashish Hinger, Sunnyvale, CA (US); David William Burns, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/782,750

(22) Filed: Oct. 12, 2017

(65) Prior Publication Data

US 2018/0031686 A1 Feb. 1, 2018

Related U.S. Application Data

(63) Continuation of application No. 14/589,783, filed on Jan. 5, 2015, now Pat. No. 9,817,108.

(Continued)

(51) Int. Cl.

*G01S 7/52* (2006.01)
*G01S 15/02* (2006.01)
*G06K 9/00* (2006.01)

(52) U.S. Cl.

CPC .......... *G01S 7/52017* (2013.01); *G01S 15/02* (2013.01); *G06K 9/0002* (2013.01)

(58) Field of Classification Search

CPC ........ G01S 7/52017; G01S 15/02; G01S 7/52; G06K 9/0002

(Continued)

(56) References Cited

U.S. PATENT DOCUMENTS 5,744,898 A 4/1998 Smith et al.
6,240,199 B1 * 5/2001 Manchanda ............ G01D 5/24 257/415

(Continued)

FOREIGN PATENT DOCUMENTS

JP 2012127945 A 7/2012

OTHER PUBLICATIONS

Coutard F., et al., "Modeling of an Ultrasonic Auto-Controlled Frequency Generator in VHDL-AMS Language", Measurement Science and Technology, IOP, Bristol, GB, vol. 19, No. 4, Apr. 1, 2008 (Apr. 1, 2008), 45107, XP020136185,10 pages,ISSN: 0957-0233, Sections 1-3.

(Continued)

*Primary Examiner* — Isam A Alsomiri
*Assistant Examiner* — Amie M Ndure
(74) *Attorney, Agent, or Firm* — Kilpatrick Townsend & Stockton

(57) ABSTRACT

Techniques describe structures and methods for generating larger output signals and improving image quality of ultrasonic sensors by inclusion of an acoustic cavity in the sensor stack. In some embodiments, an ultrasonic sensor unit may be tuned during manufacturing or during a provisioning phase to work with different thicknesses and materials. In some embodiments, a standing wave signal may be generated using an acoustic cavity in the ultrasonic sensor unit for capturing an ultrasonic image of an object placed on a sensor surface. In some implementations, the ultrasonic sensor may include an ultrasonic transmitter, a piezoelectric receiver, a (Continued)

Cross-Sectional View of Ultrasonic Sensor Array thin film transistor (TFT) layer and a TFT substrate positioned between the transmitter and the receiver, one or more adhesive layers, and optional cover materials and coatings. The thickness, density and speed of sound of the sensor materials and associated adhesive attachment layers may be used to attain the desired acoustic cavity and improved performance.

30 Claims, 17 Drawing Sheets

Related U.S. Application Data

(60) Provisional application No. 61/926,829, filed on Jan. 13, 2014.

(58) Field of Classification Search
USPC .............................................................. 367/7
See application file for complete search history.

(56) References Cited

U.S. PATENT DOCUMENTS

| | | | | |
|---|---|---|---|---|
| 6,702,747 | B2 | 3/2004 | Garlick | |
| 7,223,243 | B2 | 5/2007 | Morris et al. | |
| 7,400,750 | B2 | 7/2008 | Nam | |
| 7,436,736 | B2 | 10/2008 | Schneider et al. | |
| 7,739,912 | B2 | 6/2010 | Schneider et al. | |
| 7,893,474 | B2 | 2/2011 | So et al. | |
| 8,079,263 | B2 | 12/2011 | Randall et al. | |
| 8,098,915 | B2 | 1/2012 | Schneider et al. | |
| 8,139,827 | B2 | 3/2012 | Schneider et al. | |
| 8,201,739 | B2 | 6/2012 | Schneider et al. | |
| 8,539,837 | B2 | 9/2013 | Wong et al. | |
| 8,601,876 | B2 | 12/2013 | Schneider et al. | |
| 8,667,846 | B2 | 3/2014 | Huffman et al. | |
| 8,733,173 | B2 | 5/2014 | Wong et al. | |
| 9,259,961 | B2 * | 2/2016 | Wong | B60B 1/02 |
| 2004/0113522 | A1 | 6/2004 | Nagahara et al. | |
| 2004/0113524 | A1 * | 6/2004 | Baumgartner | B06B 1/0292 310/328 |
| 2004/0140735 | A1 * | 7/2004 | Scott | G06K 9/0002 310/328 |
| 2005/0043608 | A1 * | 2/2005 | Haj-Yousef | A61B 5/053 600/407 |
| 2007/0075919 | A1 * | 4/2007 | Breed | B60R 21/013 345/8 |
| 2008/0168638 | A1 | 7/2008 | Bhattacharjee et al. | |
| 2008/0258580 | A1 | 10/2008 | Schneider et al. | |
| 2008/0295600 | A1 | 12/2008 | Simonet | |
| 2010/0237992 | A1 * | 9/2010 | Liautaud | G06K 9/0002 340/5.83 |
| 2011/0279662 | A1 | 11/2011 | Schneider et al. | |
| 2011/0316388 | A1 | 12/2011 | Akiyama et al. | |
| 2012/0147698 | A1 * | 6/2012 | Wong | B06B 1/02 367/7 |
| 2012/0163126 | A1 * | 6/2012 | Campbell | B06B 1/0614 367/135 |
| 2012/0206585 | A1 | 8/2012 | Schneider et al. | |
| 2013/0201134 | A1 | 8/2013 | Schneider et al. | |
| 2014/0146279 | A1 * | 5/2014 | Kim | G02B 1/105 349/122 |
| 2015/0198699 | A1 | 7/2015 | Kuo et al. | |
| 2015/0362589 | A1 * | 12/2015 | Tsai | G01S 7/521 367/7 |
| 2017/0082740 | A1 * | 3/2017 | Kitchens, II | G01S 7/539 |

OTHER PUBLICATIONS

International Search Report and Written Opinion—PCT/US2015/010560—ISA/EPO—dated Apr. 9, 2015.

* cited by examiner

Finger print image at 10 MHz (6-cycle TB) and the frequency response with different TB cycles.

Finger print image at 9 MHz (6-cycle TB) and the frequency response with different TB cycles.

Sensor Stack with Acoustic Cavity Resonator
(Assembled View)

ULTRASONIC IMAGING WITH ACOUSTIC RESONANT CAVITY

CROSS REFERENCE SECTION

This application is a continuation of U.S. Non-Provisional application Ser. No. 14/589,783, filed Jan. 5, 2015, titled "ULTRASOUND IMAGING USING RESONANT CAVITY," which claims the benefit and priority of U.S. Provisional Application No. 61/926,829, filed on Jan. 13, 2014, titled "ULTRASOUND IMAGING USING RESONANT CAVITY," which is herein incorporated by reference in its entirety for all purposes.

TECHNICAL FIELD

The present disclosure generally relates to sensing technology and more specifically to ultrasonic sensing technology.

BACKGROUND

Sensors detect physical input and in some instances convert the physical input to electrical or optical output. A device may use the electrical output in a variety of ways. Applications of sensors are widespread and sensors are used in everyday devices, such as mobile devices. Specifically, sensors are gaining popularity for biometric readings, such as for reading fingerprints and for authenticating users. Traditionally, ultrasonic systems have operated by interpreting the echoes from sound waves reflecting off of distant objects. For instance, ultrasonic sensors may generate high-frequency sound waves and evaluate the echo that is received back by the sensor. Ultrasonic sensors generally calculate the time interval between sending the signal and receiving the echo to determine the distance to an incident surface of the distant object. In some implementations such as mobile phones, tablet computers, wearable health-monitoring devices and other mobile devices, the total thickness for the ultrasonic sensor must be small, on the order of one millimeter thick or less, limiting the use of traditional approaches.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

SUMMARY

Figure 1:
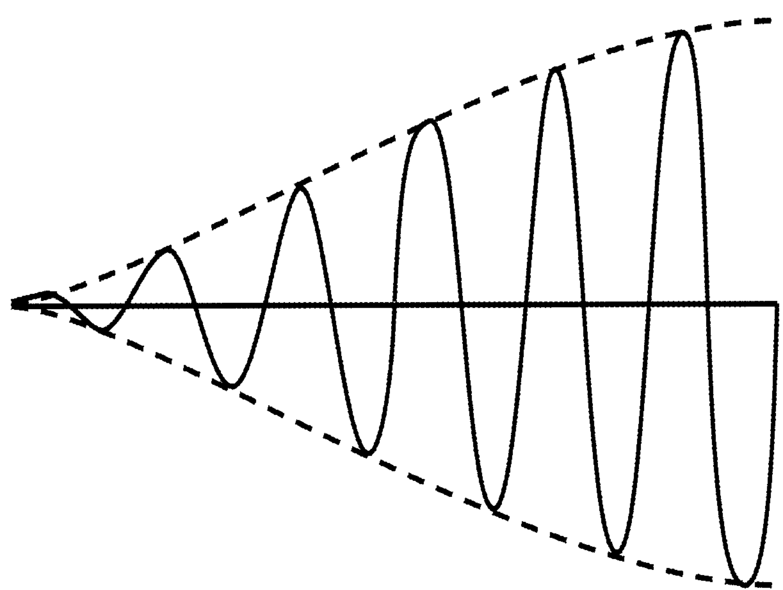
FIG. 1 illustrates buildup of a standing wave signal according to one or more aspects of the disclosure.

Aspects described herein provide structures and methods for generating larger output signals and improving image quality of ultrasonic sensors by inclusion of an acoustic cavity in the sensor stack of an ultrasonic sensor unit, allowing the amplitude of the generated ultrasonic wave to increase with multiple excitation signal pulses compared to approaches where the amplitude of the generated wave is limited by the displacement attainable with single-cycle excitation. In some aspects, the thickness of the ultrasonic sensor unit may be significantly reduced to accommodate the low profiles often desired for mobile devices. In some implementations, the ultrasonic sensor may be designed and fabricated to form an effective acoustic cavity for the desired operating frequencies with the various substrate materials, electrode materials, adhesives, piezoelectric materials, and other materials (e.g. cover glass, platen, cover layer, coatings, etc.) that may be desired. The ultrasonic sensor may be tuned or otherwise calibrated during manufacturing or during a provisioning phase to work with different encapsulations, thicknesses and materials.

In some implementations, an ultrasonic standing wave signal may be generated using an acoustic cavity in the ultrasonic sensor for capturing an ultrasonic image of an object placed on an imaging surface of the sensor. In some implementations, the ultrasonic sensor may have an ultrasonic transmitter (Tx) including a piezoelectric transmitter layer and one or more transmitter electrodes disposed on opposing sides of the piezoelectric transmitter layer, a receiver (Rx) including a piezoelectric receiver layer with a receiver bias electrode disposed on one side of the piezoelectric receiver layer, and a thin film transistor (TFT) layer disposed on a TFT substrate that may be positioned between the transmitter, receiver and any associated adhesive attachment layers, cover layers or coatings. In some implementations, the thickness of and speed of sound within the piezoelectric transmitter and receiver layers and the Tx and Rx electrodes along with the adhesive layers, the TFT substrate and other layers may be selected and used to form the desired acoustic cavity.

In some implementations, a standing wave signal may be built up by launching multiple cycles (e.g. 4-8) of single- or double-digit megahertz ultrasonic waves. The acoustic cavity designed into the sensor stack allows buildup of the amplitude and acoustic energy of the ultrasonic wave within the cavity prior to acquiring an image. The resonant frequency of this acoustic resonant cavity may be predominately determined by the thickness of individual layers and total thickness of the stack, the density of each material in the stack, the elastic moduli of materials in the stack, the speed of sound in each material, and the rigidity of the boundary conditions. The resonance may be damped/enhanced or shifted when an object (such as a finger) is placed on the sensor surface. Moreover, the amplitude and/or phase of the reflected signal may be different with and without an object positioned on the surface. As a result, changes in the magnitude and/or phase of the standing wave may be detected by measuring the generated sensor output voltages at the receiver and converting the sensor output voltages to digital information with, for example, an analog to digital converter (ADC).

An example method for generating an image of a target object may include applying a plurality of excitation signal pulses to an ultrasonic transmitter of an ultrasonic sensor unit, wherein a frequency of the plurality of excitation signal pulses is selected to generate an ultrasonic standing wave signal inside the ultrasonic sensor unit and wherein the plurality of excitation signal pulses are applied for a duration to allow buildup of energy for the ultrasonic standing wave signal over a first threshold level; detecting a change in one or more characteristics of the ultrasonic standing wave signal associated with an interaction between the ultrasonic standing wave signal and the target object using an ultrasonic receiver of the ultrasonic sensor unit; and generating the image of the target object based on the detected change in the one or more characteristics of the ultrasonic standing wave signal.

In certain aspects, the duration may be based on passing of a reference time period or the number of the excitation signal pulses. The number of excitation signal pulses may include 4 pulses or more, 5 pulses or more, or 6 pulses or more. Detecting the change in the one or more characteristics of the ultrasonic standing wave signal may include detecting a change in amplitude of the ultrasonic standing wave signal, a change in phase of the ultrasonic standing wave signal, or both.

In certain aspects of the method, the ultrasonic standing wave signal may result from constructive interference of generated ultrasonic wave signals with one or more reflected ultrasonic signals inside an acoustic cavity of the ultrasonic sensor unit at the selected frequency. The one or more ultrasonic reflected signals may be generated from reflection of the ultrasonic wave signals off of one or more boundaries of the ultrasonic sensor unit.

In certain implementations of the method, the change in the one or more characteristics of the ultrasonic standing wave signal may be detected while the excitation signal pulses are being applied to the ultrasonic transmitter of the ultrasonic sensor unit. In another implementation of the method, the change in the one or more characteristics of the ultrasonic standing wave signal may be detected after the excitation signal pulses are applied to the ultrasonic transmitter of the ultrasonic sensor unit.

An example ultrasonic sensor system may include an ultrasonic transmitter, an ultrasonic receiver, and a control unit. The ultrasonic transmitter can be configured to receive a plurality of excitation signal pulses, wherein a frequency of the received excitation signal pulses is selected to generate an ultrasonic standing wave signal inside an ultrasonic sensor unit of the ultrasonic sensor system and wherein the excitation signal pulses are received for a duration to allow buildup of energy in the ultrasonic standing wave signal over a first threshold level. The ultrasonic receiver can be configured to detect a change in one or more characteristics of the ultrasonic standing wave signal associated with an interaction between the ultrasonic standing wave signal and a target object. The control unit can be configured to generate an image of the target object based on the detected change in the one or more characteristics of the ultrasonic standing wave signal.

In certain aspects, the duration may be based on passing of a reference time period or the number of the excitation signal pulses. The number of excitation signal pulses may include 4 pulses or more, 5 pulses or more, or 6 pulses or more. Detecting the change in the one or more characteristics of the ultrasonic standing wave signal may include detecting a change in amplitude of the ultrasonic standing wave signal, a change in phase of the ultrasonic standing wave signal, or both.

In certain implementations of the ultrasonic sensor unit, at least the ultrasonic transmitter, the ultrasonic receiver, and a thin film transistor (TFT) substrate form an acoustic cavity inside the ultrasonic sensor unit. The TFT substrate may be positioned between the transmitter and the receiver. In addition, in certain implementations, the ultrasonic sensor unit may include a cover layer positioned over the ultrasonic receiver. In certain implementations, the selected frequency for the excitation signal pulses is based on a thickness of an acoustic cavity, a density of the acoustic cavity, a speed of sound in the acoustic cavity, or any combination thereof.

In certain implementations of the ultrasonic sensor unit, the change in the one or more characteristics of the ultrasonic standing wave signal may be detected while the excitation signal pulses are being applied to the ultrasonic transmitter of the ultrasonic sensor unit. In another implementation of the ultrasonic sensor unit, the change in the one or more characteristics of the ultrasonic standing wave signal may be detected after the excitation signal pulses are applied to the ultrasonic transmitter of the ultrasonic sensor unit.

In one implementation, the ultrasonic sensor unit is an ultrasonic fingerprint sensor and the target object is a finger. An image of the fingerprint may be generated by detecting the change in the one or more characteristics of the ultrasonic standing wave signal by touching of a ridge of the finger to a sensor surface of the ultrasonic sensor unit.

An example ultrasonic sensor system may include means for applying a plurality of excitation signal pulses to an ultrasonic transmitter of an ultrasonic sensor unit, wherein a frequency of the plurality of excitation signal pulses is selected to generate an ultrasonic standing wave signal inside the ultrasonic sensor unit and wherein the plurality of excitation signal pulses are applied for a duration to allow buildup of energy for the ultrasonic standing wave signal over a first threshold level; means for detecting a change in one or more characteristics of the ultrasonic standing wave signal associated with an interaction between the ultrasonic standing wave signal and the target object using an ultrasonic receiver of the ultrasonic sensor unit; and means for generating the image of the target object based on the detected change in the one or more characteristics of the ultrasonic standing wave signal.

In certain aspects, the duration may be based on passing of a reference time period or the number of the excitation signal pulses. The number of excitation signal pulses may include 4 pulses or more, 5 pulses or more, or 6 pulses or more. Detecting the change in the one or more characteristics of the ultrasonic standing wave signal may include means for detecting a change in amplitude of the ultrasonic standing wave signal, a change in phase of the ultrasonic standing wave signal, or both.

An example non-transitory computer-readable storage medium, wherein the non-transitory computer-readable storage medium may include instructions executable by a processor may include the instructions to apply a plurality of excitation signal pulses to an ultrasonic transmitter of an ultrasonic sensor unit, wherein a frequency of the plurality of excitation signal pulses is selected to generate an ultrasonic standing wave signal inside the ultrasonic sensor unit and wherein the plurality of excitation signal pulses are applied for a duration to allow buildup of energy for the ultrasonic standing wave signal over a first threshold level; detect a change in one or more characteristics of the ultrasonic standing wave signal associated with an interaction between the ultrasonic standing wave signal and the target object using an ultrasonic receiver of the ultrasonic sensor unit; and generate the image of the target object based on the detected change in the one or more characteristics of the ultrasonic standing wave signal.

In one implementation of the non-transitory computer-readable storage medium the duration may be based on passing of a reference time period or the number of the excitation signal pulses. The number of excitation signal pulses may include 4 pulses or more, 5 pulses or more, or 6 pulses or more. Detecting the change in the one or more characteristics of the ultrasonic standing wave signal may include detecting a change in amplitude and/or phase of the ultrasonic standing wave signal. In certain aspects, the change in the one or more characteristics of the ultrasonic standing wave signal is detected while the excitation signal pulses are being applied to the ultrasonic transmitter of the ultrasonic sensor unit.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

DETAILED DESCRIPTION

Several illustrative embodiments will now be described with respect to the accompanying drawings, which form a part hereof. While particular embodiments in which one or more aspects of the disclosure may be implemented are described below, other embodiments may be used and various modifications may be made without departing from the scope of the disclosure or the spirit of the appended claims.

Generally, as ultrasonic signals travel through a medium (e.g., traveling waves), they may be observed as waves with crests followed by troughs over a period of time. However, when the signals are incident on an acoustically mismatched boundary, the signals may be partially transmitted into the adjacent medium and partially reflected backwards. If the ultrasonic signals are traveling through a substantially solid medium and the adjacent medium is air, most of the signal may be reflected back into the solid medium, since air tends to form a highly compliant boundary condition and little acoustic energy may be transmitted into the air due to the high level of acoustic mismatch.

The reflected portion of the ultrasonic signal may interfere with each consecutively generated ultrasonic wave signal in a given medium (or plurality of mediums) within a sensor stack and produce an enhanced wave that may amplify over time, by the plurality of signals constructively interfering with each other over time. As described herein, an excitation signal pulse may refer to an electrical signal applied to an ultrasonic transmitter for generating ultrasonic wave signals within an ultrasonic sensor. Each excitation signal pulse may correspond to an ultrasonic wave signal generated within the sensor. The ultrasonic wave signals may have an associated wavelength and frequency within each medium or layer of the sensor stack and may be generated by applying transmitter excitation signal pulses to one or more transmitter electrodes using, for example, an external power source or a transmitter excitation signal pulse generator circuit, also known as a tone-burst generator. One or more electrical excitation signal pulses may be applied in succession to the ultrasonic transmitter. The frequency of the applied excitation signal pulses may result in a buildup of the energy and amplitude of an ultrasonic standing wave developed, formed or otherwise generated within the ultrasonic sensor. The frequency of the applied excitation signal pulses may be inversely related to the time interval between the start of a first excitation signal pulse (or cycle) and a corresponding portion of a second excitation signal pulse (or cycle). In some implementations, the frequency of the applied excitation signal pulses may be inversely related to the time period (e.g., total time duration in seconds) for each pulse. In some embodiments, the excitation signal pulse may be referred to as an electrical excitation signal pulse, tone burst, cycle or merely signal, which may be used interchangeably in this disclosure without deviating from the scope of the invention.

With proper selection of the excitation frequency and waveform for a given set of materials and thicknesses, the incident signal (e.g., generated ultrasonic wave signal) and reflected signal may combine in such a manner to constructively overlap each other as they bounce between the boundaries of the medium causing the ultrasonic wave to appear standing, which may be referred to as a standing wave, standing wave signal or ultrasonic standing wave signal. Furthermore, with continued generation and application of the excitation signal pulses, the constructive incident and reflected signals may continue to add up in amplitude as an equilibrium value is approached. The ultrasonic wave signals in the medium may continue to increase in amplitude until the excitation signal pulses are decreased in amplitude or are removed altogether (e.g., stopped or no longer applied).

Proper selection of the material, thickness, and density of the various mediums or layers in the sensor stack may result in the formation of an acoustic cavity that exhibits resonance or resonant behavior for forming the standing wave signal at a particular frequency. An acoustic cavity may also be referred to as an acoustic resonant cavity, a resonant acoustic cavity, a resonant cavity, an acoustic resonator or a cavity resonator, interchangeably with each other without deviating from the scope of the invention.

Figure 2:
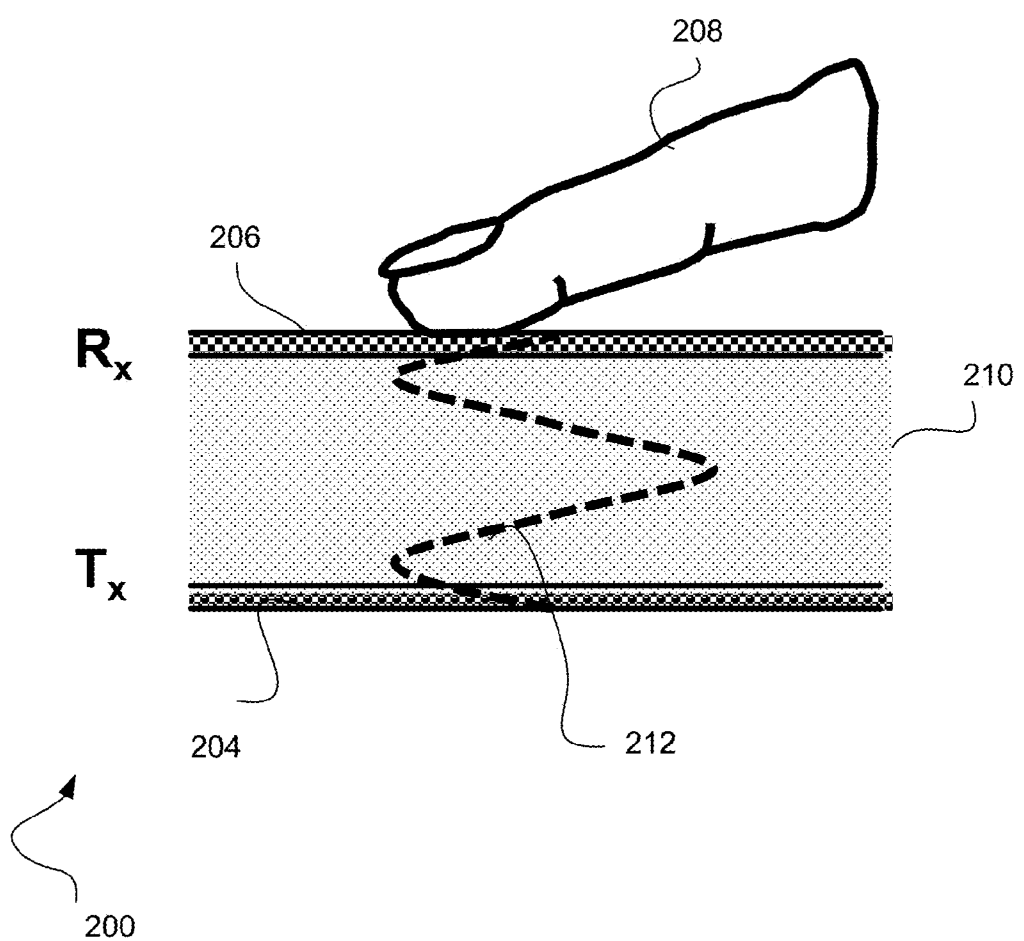
FIG. 2 illustrates a cross-sectional view of an example configuration for an ultrasonic sensor unit.

FIG. 1 shows a buildup of a standing wave signal, as described above, according to one or more aspects of the disclosure. FIG. 1 illustrates the gradual buildup of the amplitude and energy of the standing wave signal over multiple applied excitation signal pulses in the acoustic cavity. The dashed line in FIG. 1 indicates the envelope corresponding to the amplitude of the standing wave signal as it builds up over time. In some implementations, the acoustic cavity is formed by various layers within the sensor stack and the standing wave signal is generated with the application of the proper excitation frequency using the ultrasonic transmitter. In FIG. 1, the amplitude (e.g., displacement) and energy of the ultrasonic wave in the acoustic cavity increases over time as the number of excitation signal pulses applied to the transmitter and the number of generated ultrasonic wave signals increases (six pulses shown), which may continue until an equilibrium amplitude is reached. FIG. 2 illustrates a cross-sectional view of an example configuration for an ultrasonic sensor 200. FIG. 2 illustrates an ultrasonic sensor that may be configured to generate a standing wave signal as described above. The ultrasonic sensor may have an ultrasonic transmitter (Tx) 204, an ultrasonic receiver (Rx) 206, and a thin-film transistor (TFT) layer 210 including a TFT substrate and TFT pixel circuits positioned between the transmitter 204 and receiver 206. Although only three layers are shown in FIG. 2 for illustration purposes, other layers may also be implemented without departing from the scope of the invention. FIG. 2 is further characterized with having minimal or no separation between portions of a finger 208 and the receiver 206. In some implementations, the top surface may be coated with a protective film, such as parylene, a urethane coating, an acrylic coating, a hard coat such as a diamond-like coating (DLC), or other suitable coating. In FIG. 2, an acoustic cavity is formed by the transmitter 204, the TFT layer 210 and the receiver 206. FIG. 2 shows a representative waveform for a standing wave signal 212 generated in the ultrasonic sensor 200 (one and one-half wavelengths of the standing wave signal are shown). As described in further detail below with reference to FIG. 5, the touching of an object such as a finger 208 on a sensor surface of the sensor stack may change characteristics of the standing wave signal such as amplitude or phase at the receiver 206, allowing for detection of the ridges and valleys of the fingerprint and acquisition of an image such as a fingerprint or other biometric information with a TFT sensor array having sufficient resolution. Note that an acoustic resonant cavity may have more than one resonant frequency, and operation at a low or fundamental resonant frequency may be less desirable than operating at or near a higher resonant frequency. For example, enhancements to the image resolution and quality may be obtained when operating at a higher frequency, due in part to the smaller acoustic wavelength in the sensor unit with higher operating frequencies.

In some implementations, the transmitter (Tx) 204 may include an electrically conductive layer of silver and polyurethane (Ag-Ur) on a layer of piezoelectric material such as polyvinylidene flouride (PVDF) and a second layer of silver-urethane (Ag-Ur) on an opposing surface of the PVDF layer, with example thicknesses of 9 um, 28 um and 9 um, respectively. The TFT substrate of the TFT layer 210 may be implemented using glass or plastic and may have a thickness of about 500 um. TFT pixel circuits may be formed on the TFT substrate using, for example, a low-temperature polysilicon, amorphous silicon, or other insulated-gate thin-film transistor process. The receiver (Tx) 206 may include a piezoelectric layer of PVDF covered with a silver-urethane layer having a thickness of about 28 um and 9 um, respectively. The total thickness of the acoustic cavity may be the sum total of the thickness for each of the layers of the ultrasonic sensor unit.

Figure 3:
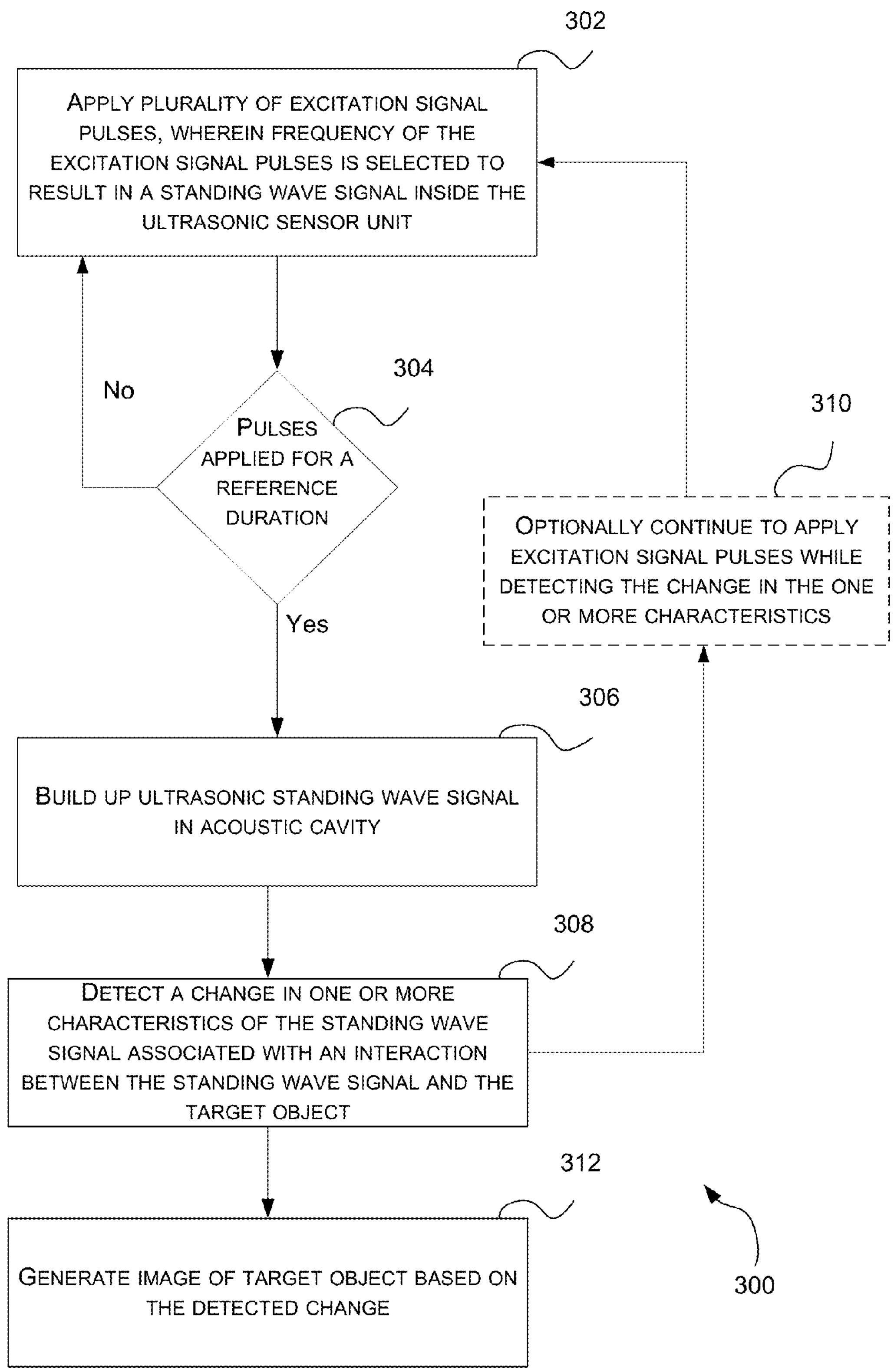
FIG. 3 illustrates a flow diagram for performing a method according to one or more aspects of the disclosure.

FIG. 3 illustrates a flow diagram for performing a method according to one or more aspects of the disclosure. According to one or more aspects, any and/or all of the methods and/or method steps described in the flow diagram 300 illustrated in FIG. 3 may be implemented by electronic, mechanical and/or chemical components of a sensor either implemented as a stand-alone sensor or coupled to a computing device, such as a mobile device. Components of the computing device are described in greater detail in FIG. 14, for instance. In some implementations, one or more of the method steps described below with respect to FIG. 3 may be implemented by a processor or application specific integrated circuit (ASIC) of the mobile device, such as the processor 1410 or another processor or circuitry directly coupled to the sensor. Additionally or alternatively, any and/or all of the methods and/or method steps described herein may be implemented in computer-readable instructions, such as computer-readable instructions stored on a computer-readable medium such as the memory 1435, storage device 1425 or another computer readable medium.

At block 302, components of the ultrasonic sensor unit, such as the ultrasonic transmitter and control electronics, may be provided and configured to generate one or more electrical excitation signal pulses and corresponding ultrasonic wave signals in the sensor unit. In some implementations, the transmitter may be a piezoelectric transmitter. Piezoelectric transmitters may excite, generate or otherwise transmit mechanical motions and displacements upon application of an appropriate voltage difference across the transmitter electrodes of the piezoelectric transmitter.

One or more electrical excitation signal pulses may be applied to one or more electrodes of the ultrasonic transmitter. The frequency of the excitation signal pulses may be selected to generate an ultrasonic standing wave signal inside the ultrasonic sensor unit. The standing wave signal may result from the constructive interference of generated ultrasonic wave signals with one or more reflected ultrasonic signals inside an acoustic cavity of the ultrasonic sensor unit at the selected frequency. The reflected signals may be generated from the reflection of one or more ultrasonic wave signals off the boundaries or interfaces between various mediums or layers of the ultrasonic sensor unit. During manufacturing or a provisioning phase, the transmitter may be configured to receive an appropriate number and frequency of excitation signal pulses to coincide or closely coincide with a resonant frequency of the ultrasonic sensor unit, allowing for the generation of the standing wave signal in the acoustic cavity within the ultrasonic sensor unit.

The ultrasonic sensor unit may continue to generate excitation signal pulses and ultrasonic wave signals from components of the ultrasonic sensor unit, such as the transmitter, for a reference duration. At block 304, components of the ultrasonic sensor unit or components coupled to the ultrasonic sensor unit may determine if the reference duration has completed for sufficient building up of the standing wave signal. In some implementations, the reference duration may be determined by counting the number of excitation signal pulses that have been applied.

In some implementations, the reference duration may be based on the passing of a predetermined amount of time or reference time period. In some implementations, the predetermined duration or reference time period may be based on the number and frequency of excitation signal pulses for generating the ultrasonic wave signals. In some implementations, the reference time period may equal the number of excitation signal pulses times the duration of each pulse (e.g., the number of cycles times the duration or period of each cycle). As discussed in FIGS. 6A, 6B and 6C, the optimal number of excitation signal pulses for some implementations may be 4 pulses or more, 5 pulses or more, or 6 pulses or more. In some implementations, after a reference number of excitation signal pulses have been applied, the standing wave signal may reach close to a saturation amplitude, wherein any additional excitation signal pulses do not result in a proportional energy buildup in the amplitude of the standing wave signal for the ultrasonic sensor unit and/or improvement in the resolution of the resultant image from detecting changes in the characteristics of the standing wave signal.

Figure 4A:
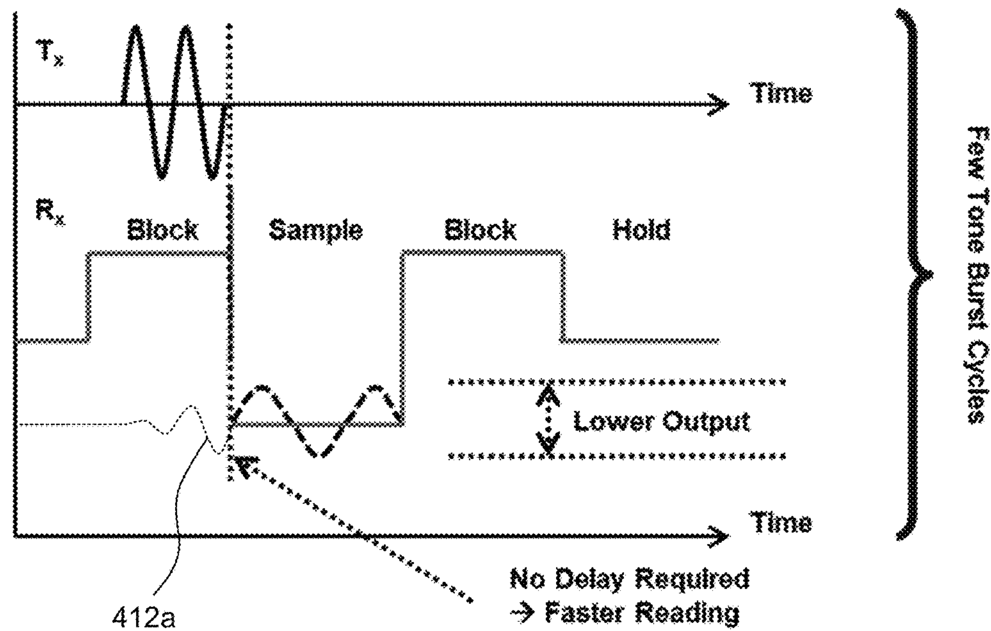
FIG. 4A and FIG. 4B respectively illustrate two graphs representing the formation of a standing wave signal with varying amplitude in an acoustic cavity of an ultrasonic sensor unit.
Figure 4B:
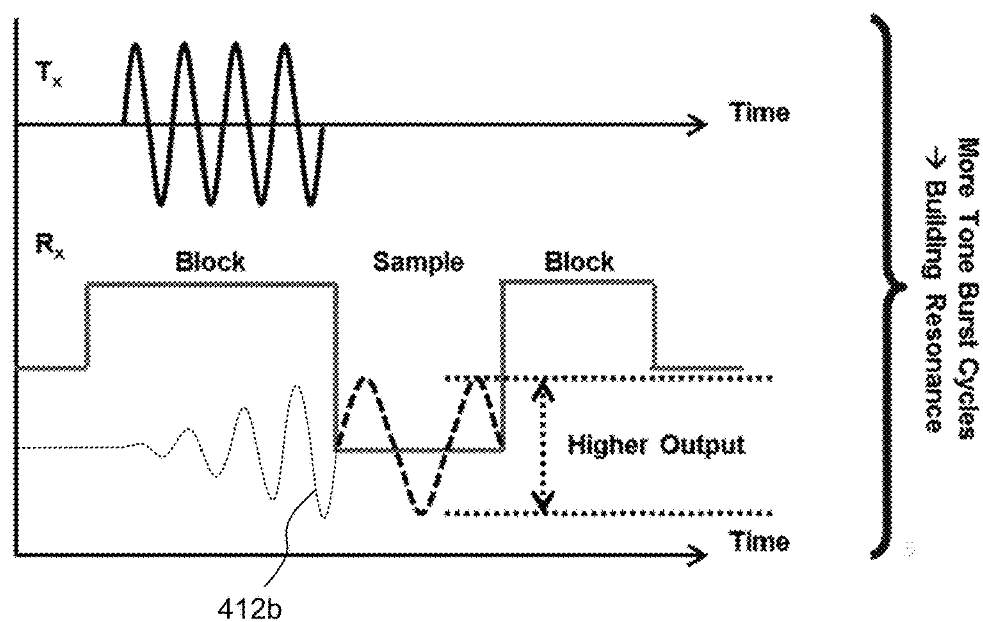

Momentarily referring to FIG. 4A and FIG. 4B, the duration of the excitation or the number of applied excitation signal pulses to the ultrasonic sensor, at least initially, may result in a standing wave signal with increasing energy and amplitude. FIG. 4A and FIG. 4B, respectively, illustrate two graphs representing the formation of a standing wave signal with varying amplitude in an acoustic cavity of an ultrasonic sensor unit. FIG. 4A illustrates two tone bursts or cycles of transmitter excitation signal pulses applied to the terminals of an ultrasonic transmitter (Tx), whereas FIG. 4B illustrates four tone bursts or cycles of applied transmitter excitation signal pulses. Each cycle of the transmitter excitation signal may generate or add to a generated ultrasonic wave within the acoustic cavity of the ultrasonic sensor. In FIG. 4A, the transmitter receives fewer (two) excitation signal pulses than in FIG. 4B over a shorter period of time, resulting in a sampled waveform at the ultrasonic receiver with a lower amplitude (Lower Output in FIG. 4A) than in FIG. 4B (Higher Output in FIG. 4B) with more (four) excitation signal pulses. Buildup of a time-varying amplitude of a generated ultrasonic wave signal 412*a* within the ultrasonic sensor is shown in FIG. 4A based on only two excitation signal pulses applied to the transmitter. The generated standing wave signal (not fully formed) may be sampled by the receiver during the sample period as shown. In comparison, the time-varying amplitude of a generated ultrasonic wave signal 412*b* resulting from four excitation signal pulses applied to the Tx as shown in FIG. 4B has a higher amplitude than the ultrasonic wave signal 412*a*, resulting in a higher sensor output voltage. As illustrated, each of the electrical excitation signal pulses applied to the transmitter may be sinusoidal in form. Alternatively, the excitation signal pulses may have other waveforms such as square waves, short high-amplitude pulses, partial-cycle or half-cycle waves, or other suitable waveforms having an appropriate number and period for generating a standing wave signal inside the ultrasonic sensor unit. It is understood that FIGS. 4A and 4B are schematic and intended to show the increasing amplitude resulting from the excitation of the standing wave as described elsewhere herein. The generated ultrasonic wave signal 412*a* is not drawn to any scale in either amplitude or phase.

Referring back to FIG. 3, at block 306, as described previously, the ultrasonic sensor unit may have an ultrasonic standing wave signal generated in the acoustic cavity formed by materials and layers of the ultrasonic sensor unit. The standing wave signal may result from the application of one or more electrical excitation signal pulses to the ultrasonic transmitter at the selected frequency, the generation of ultrasonic wave signals within the sensor stack, and the constructive interference of the generated ultrasonic wave signals with one or more reflected ultrasonic signals inside an acoustic cavity of the sensor unit.

At block 308, components of the ultrasonic sensor unit or a computing device coupled to the ultrasonic sensor unit, such as the receiver, may detect a change in one or more characteristics of the standing wave signal associated with an interaction between the standing wave signal and a target object. The changes in the characteristics of the standing wave signal may include the amplitude and/or phase of the standing wave signal as measured at the receiver. In some implementations, the amplitude of the standing wave signal may be detected by acquiring and measuring the peak signal voltage generated across the piezoelectric receiver layer with the pixel circuits in the TFT sensor array. In some implementations, the phase of the standing wave signal may be detected by acquiring and measuring the voltage generated across the piezoelectric receiver layer with a relatively narrow sample window (e.g., sampling period) at a prescribed time after the start or stop of the excitation signal pulses.

Again, referring to FIGS. 4A and 4B, in some implementations, the transmitting period and the receiving (or detecting) period may occur during different time intervals or with different time delays. Embodiments described herein enable components, such as the receiver, to sample the standing wave signal after the generation and application of the excitation signal pulses. In some implementations, the receiver may sample the standing wave signal immediately after the application of the excitation signal pulses, resulting in a possible reduction in electrical interference between the applied signal pulses and the detected sensor output signals. In some implementations, the receiver may sample the standing wave signal a prescribed time delay after the application of the excitation signal pulses to achieve, for example, higher image contrast or higher image quality. In some implementations, the receiver may sample the standing wave signal during the application of the excitation signal pulses, allowing the ultrasonic sensor unit to be more responsive. In some embodiments, the ultrasonic sensor unit described herein may detect a change in the standing wave signal that is accumulating (constructively) energy and amplitude rather than detecting a reflection that may result in destructive interference with the generated ultrasonic wave signals. With respect to FIG. 4A and FIG. 4B, signals may be sampled during a sample window of a sample mode, for example, with a peak detector in each of the sensor pixel circuits of the sensor array. During a hold mode, the sampled signal may be held for subsequent clocking out of the sensor image information. During a block mode, the pixel circuits may be prevented (blocked) from acquiring a signal. In some implementations, a corresponding sample, hold or block voltage level may be applied to the receiver bias electrode (Rx) to enter these various modes. In some implementations, the duration of the sample window may be referred to as a range gate window, and the time delay between the start of the excitation signal pulses and the opening of the sample window may be referred to as a range gate delay. By controlling the width and timing of the sample window, the amplitude and phase of the standing wave signal may be detected.

Referring back to FIG. 3, due to the constructive buildup of the standing wave signal, optionally, at block 310, components of the ultrasonic sensor unit or a computing device coupled to the ultrasonic sensor unit may continue to generate and apply excitation signal pulses to the transmitter, while the receiver may receive and detect changes associated with the standing wave signal. Some implementations allow the transmitter to continue to transmit and build up the standing wave signal while the receiver detects the change in one or more characteristics of the standing wave signal such as the amplitude and/or phase of the standing wave signal. This may allow the ultrasonic sensor to continuously receive and/or detect changes in characteristics of the standing wave signal without switching the transmitter and receiver on and off, increasing the responsiveness of the ultrasonic sensor unit. Alternatively, the receiver may sample the standing wave signal after the buildup of the ultrasonic standing wave has occurred and application of the excitation signal pulses has been stopped. In some implementations, the receiver may sample the standing wave signal immediately after or a prescribed time delay after the application of the excitation signal pulses.

At block 312, components of the ultrasonic sensor unit or a computing device coupled to the ultrasonic sensor unit may acquire sensor output signals from sensor pixel circuitry of the ultrasonic receiver and generate an image of a target object based on detecting the change in one or more characteristics of the standing wave signal. The target object, such as a finger, may be positioned on a sensor surface of the sensor unit. Once the receiver samples the standing wave signal, the sensor unit may acquire the samples and convert the samples from analog to digital sensor image information. The sensor image information may be further processed on an ASIC or a processor to discern the ultrasonic image acquired by the sensor, such as fingerprint images of a finger placed on the sensor unit. In some implementations, generating an image may incur additional manipulations to the sensor image information such as contrast enhancement, gray-scale adjustments, sizing and formatting to allow displaying of the generated imaging in a suitable manner. In some implementations, generating an image may involve minimal signal processing, and generating an image may include only placing or storing the detected changes in memory on a pixel-by-pixel basis to allow for further processing, such as user verification, authorization, or identification.

It should be appreciated that the specific steps illustrated in FIG. 3 provide a particular method of switching between modes of operation, according to various aspects of the disclosure. Other sequences of steps may also be performed accordingly in alternative embodiments. For example, alternative embodiments of the present disclosure may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 5:
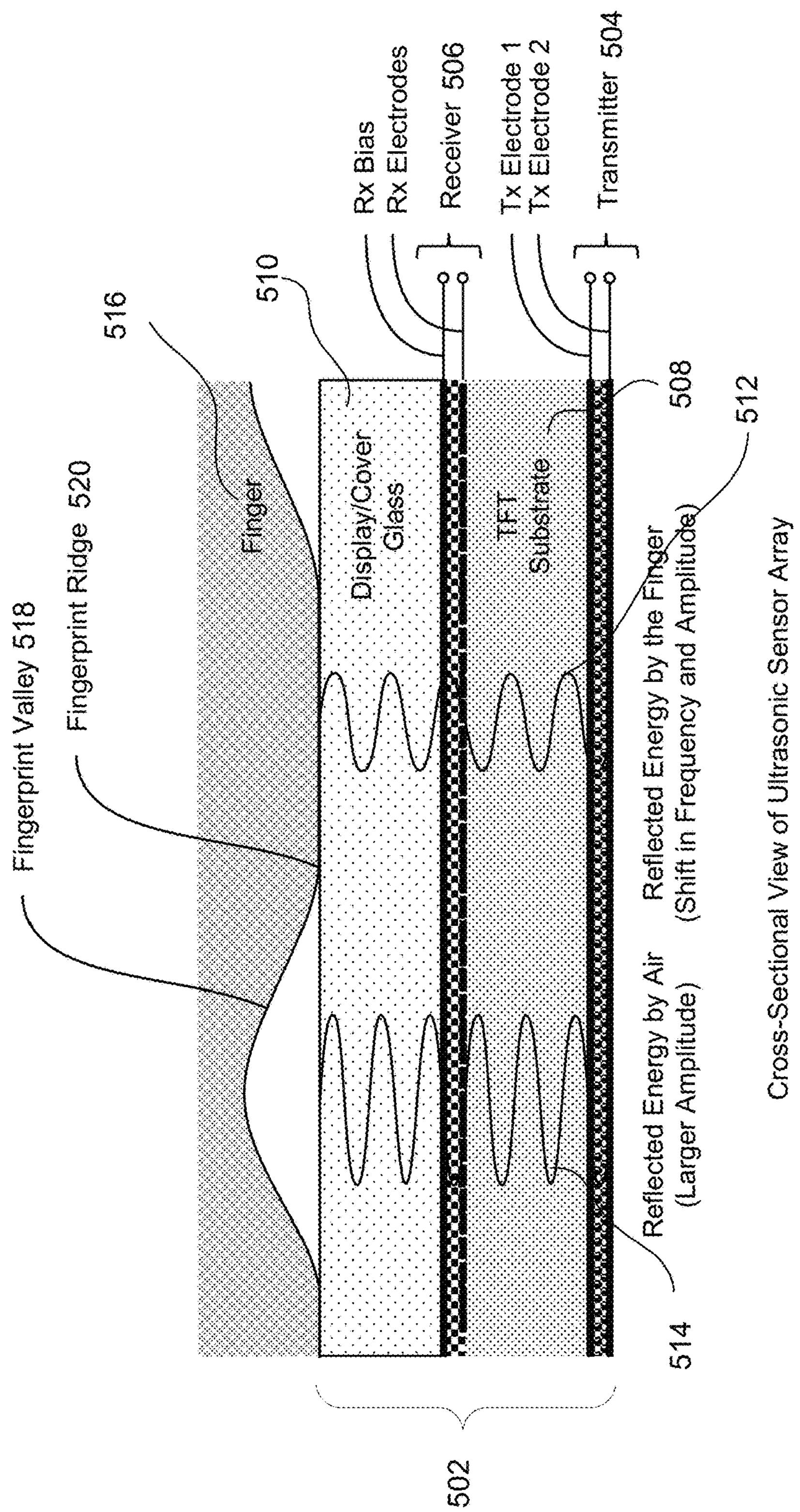
FIG. 5 illustrates a cross-sectional view of an example ultrasonic sensor unit.
Figure 13:
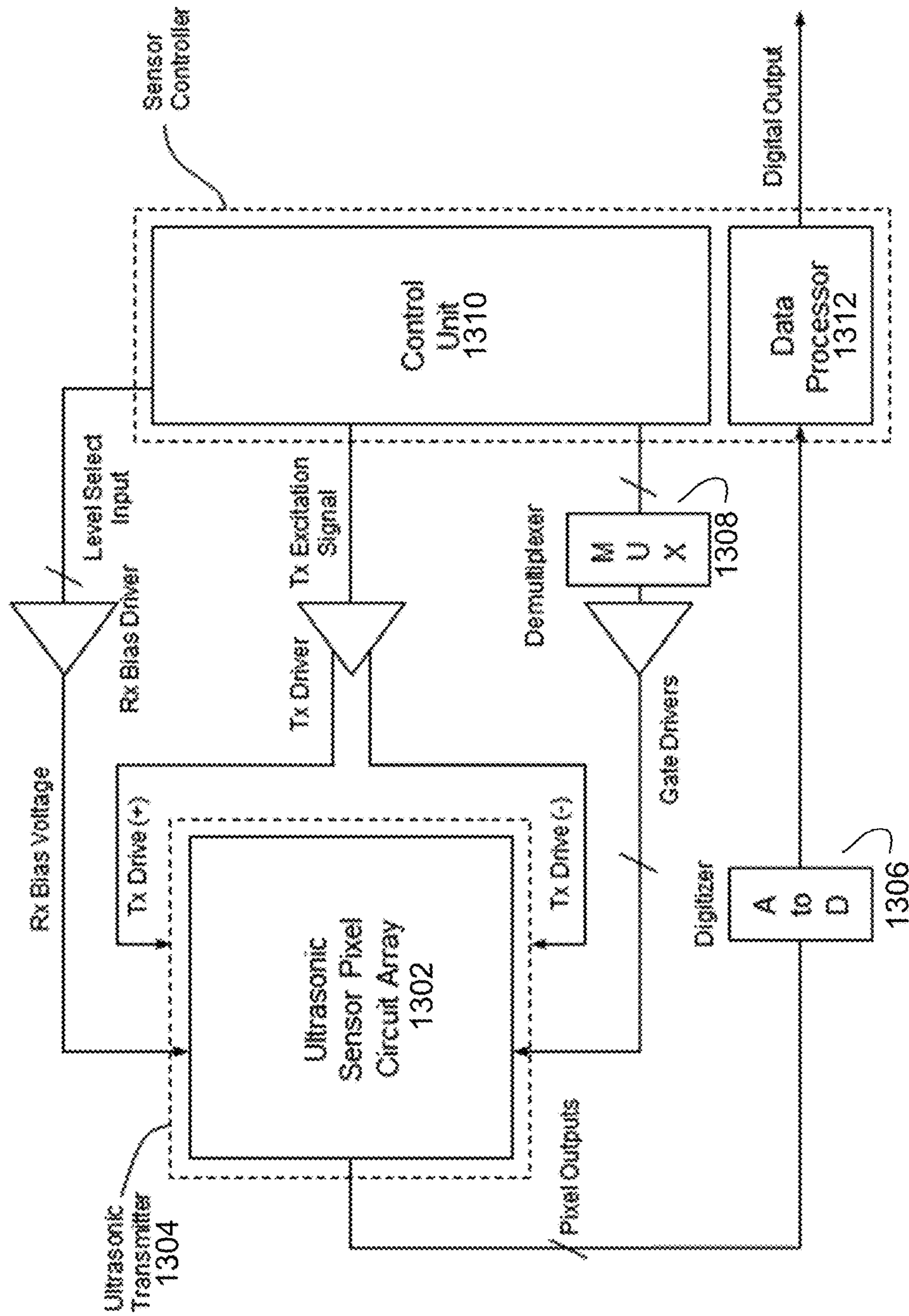
FIG. 13 illustrates a block diagram for an example representation of an ultrasonic sensor unit.

FIG. 5 illustrates a cross-sectional view of an example ultrasonic sensor unit. As shown in FIG. 5, the ultrasonic sensor unit 502 in one configuration may have an ultrasonic transmitter (Tx) 504, a receiver (Rx) 506, a TFT substrate 508 positioned between the transmitter 504 and the receiver 506, and a platen or display/cover glass 510 disposed over the receiver. Adhesive attachment layers and one or more coating layers may be included (not shown for clarity). For applying the excitation signal pulses and generating the ultrasonic wave signals, the transmitter 504 may have one or more electrodes on each side of the piezoelectric transmitter layer to apply the potential difference for driving the transmitter. Similarly, the receiver 506 may have a receiver bias (Rx Bias) electrode on one side of the piezoelectric receiver layer and a plurality of pixel input electrodes (here Rx Electrodes) coupled to the pixel circuitry of the TFT substrate 508. The pixel circuitry may be configured to detect a change in one or more characteristics of the standing wave signal in the acoustic cavity of the ultrasonic sensor unit. FIG. 13 describes aspects of the pixel circuitry in more detail.

FIG. 5 also illustrates changes in one or more characteristics of the ultrasonic standing wave signal associated with the interaction between the standing wave signal in the acoustic cavity of the ultrasonic sensor unit 502 and the target object. Detecting the change in the one or more characteristics of the signal may include detecting the change in the amplitude and/or phase of the signal. FIG. 5 illustrates an ultrasonic fingerprint sensor and the target object may be a finger. In FIG. 5, the difference in the acoustic energy reflected by air and the acoustic energy reflected by the finger may result in differences in the characteristics of the standing wave signal. For example, an air gap, formed by the fingerprint valley 518 as shown in FIG. 5, may only minimally change the amplitude and phase of the standing wave signal 514. On the other hand, touching of a fingerprint ridge 520 against an exposed portion of the sensor unit (e.g., sensor surface) may dampen the energy of the standing wave signal and may cause a shift in the frequency, amplitude and/or phase of the standing wave signal 512, as shown in FIG. 5.

Figure 6A:
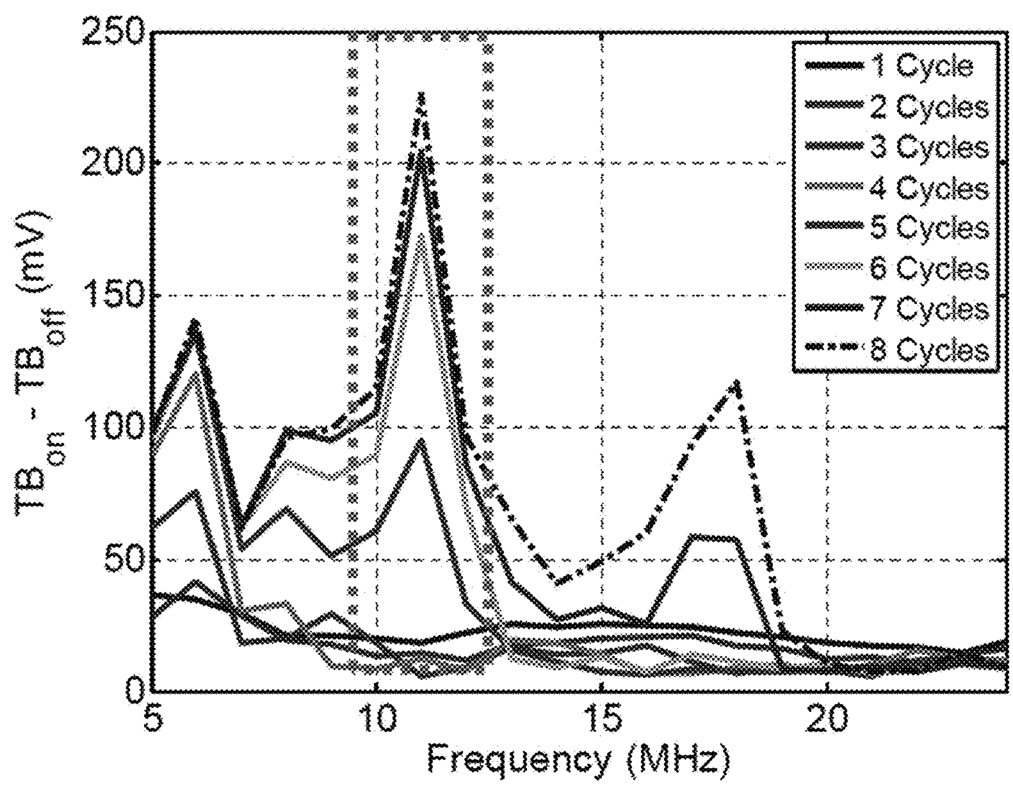
FIG. 6A illustrates a graph showing the frequency response of an exemplary sensor output with different numbers of excitation signal pulses (or cycles) for an example implementation of an ultrasonic sensor unit.

FIG. 6A illustrates a graph showing the frequency response of an exemplary sensor output, based on transmitter excitation signal pulses referred to here as tone bursts (TB) or cycles in the figures. The '$TB_{on}$-$TB_{off}$', shown as the y-axis in FIG. 6A, indicates the strength of the standing signal wave, shown in millivolts, in response to the various excitation frequencies, shown as the x-axis. The sensor output voltage '$TB_{on}$-$TB_{off}$' indicates a difference between the sensor output voltage with the application of the tone bursts ($TB_{on}$) and the sensor output voltage without the application of tone bursts ($TB_{off}$). The subtraction tends to remove or mitigate any variations in quiescent or background output signals within the sensor array. FIG. 6A further illustrates eight different waveforms, each corresponding to the frequency response for a certain number of cycles indicated in the legend that is displayed in the top right corner of FIG. 6A. According to the graph, the frequency response of the ultrasonic sensor unit is largest at around 11 MHz. Furthermore, as shown in FIG. 6A, as the number of cycles increase, the response at around 11 MHz increases significantly with the application of between about four and six cycles and then tends to level off with further increases in the number of applied cycles (around 6-8 cycles).

Figure 6B:
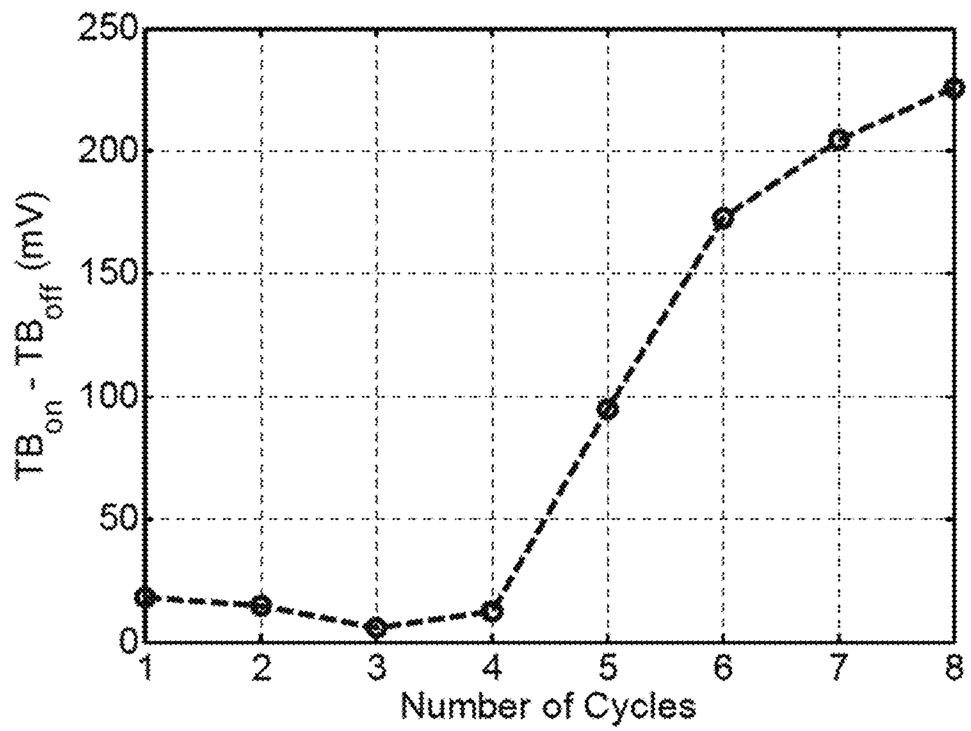
FIG. 6B illustrates the increase in the response and then a leveling off of the resonance amplitude with an increasing number of excitation signal pulses (or cycles) for the acoustic cavity.

FIG. 6B illustrates the increase in the response and then a leveling off of the resonance amplitude with respect to the number of applied cycles. Similar to FIG. 6A, the y-axis represents '$TB_{on}$-$TB_{off}$'. The x-axis represents the number of cycles. In FIG. 6B, the resonance is built up as the number of cycle increases. The change in the resonance amplitude is visible between about four and six cycles, after which the resonance response levels off gradually.

Figure 6C:
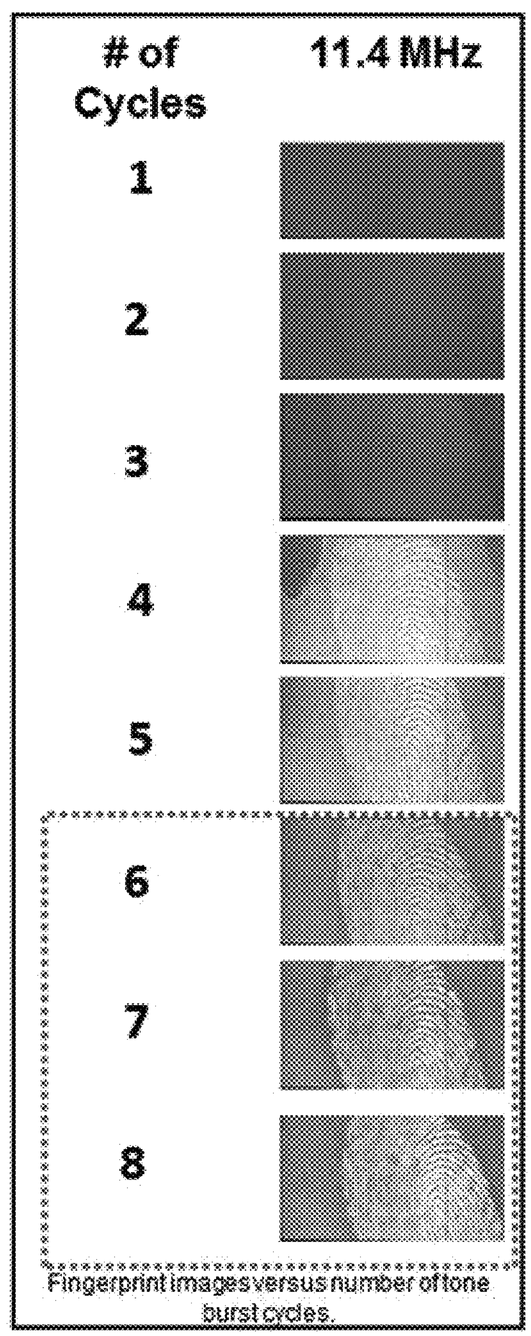
FIG. 6C illustrates successive improvement in the image quality of a fingerprint image as the number of excitation signal pulses are increased and saturation of the acquired image is approached.

FIG. 6C visually shows successive improvement in the image quality of a fingerprint image as the number of excitation signal pulses or cycles is increased and saturation of the acquired data is approached, for the implementation shown with reference to FIGS. 6A and 6B. In other words, as the number of input cycles increase, more energy accumulates inside the resonant cavity as indicated by the increase in signal strength. For this implementation, the most efficient transduction and image quality may be found at about 6 cycles and 11 MHz. A fingerprint image begins to be revealed after about four cycles. In at least this example, the output signal and image quality tends to saturate between about six and eight cycles. A threshold level may be determined that allows sufficient buildup of energy and/or amplitude of the standing wave signal. The threshold level may be based on the desired signal strength or clarity of the generated image. In some implementations, the threshold level may be a threshold number of applied excitation cycles to achieve satisfactory sensor output signal levels, image quality, or image contrast. In some implementations, the threshold level may be a minimum number of millivolts in the sensor output signal (e.g., $TB_{on}$-$TB_{off}$) to generate an image.

Figure 7A:
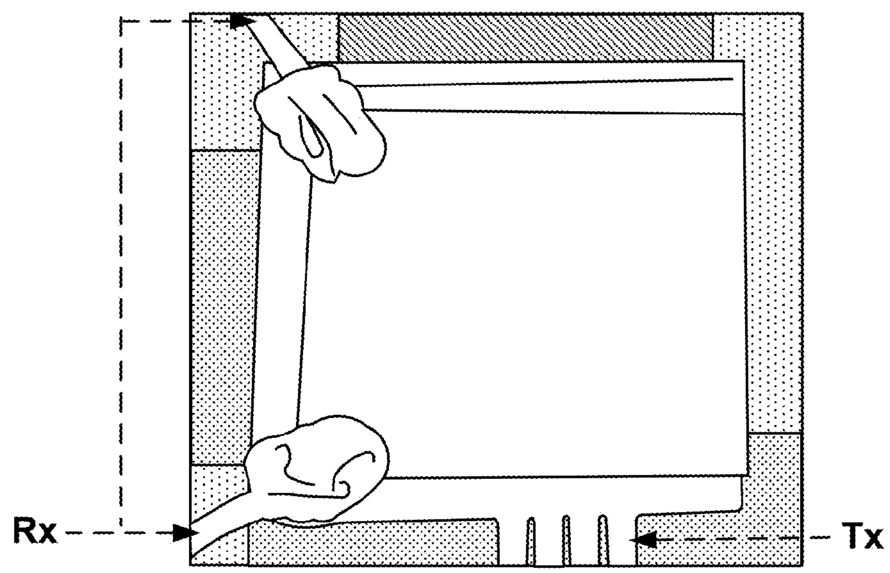
FIG. 7A shows an example top view of an implementation of an ultrasonic fingerprint sensor.
Figure 7B:
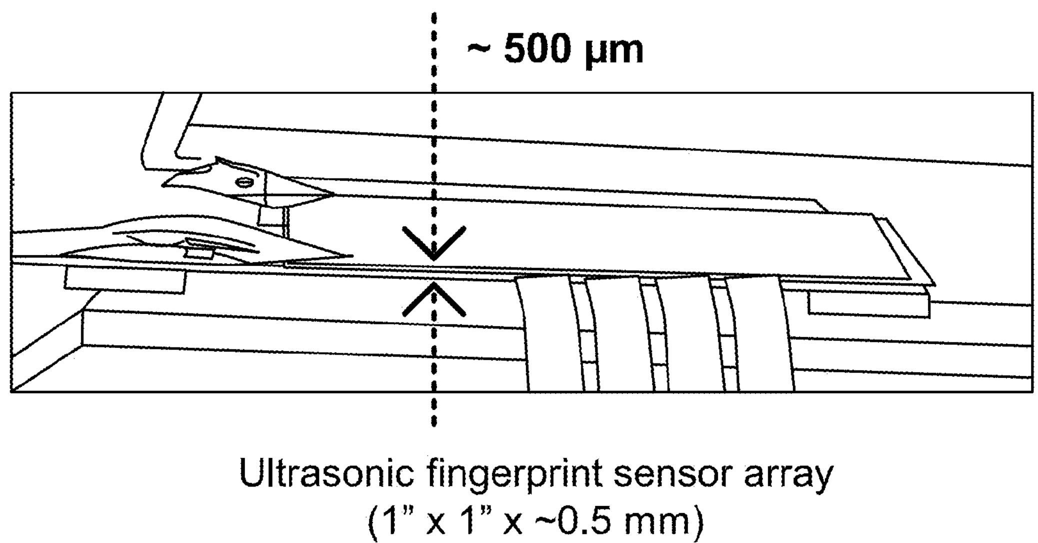
FIG. 7B shows an example side view of the ultrasonic fingerprint sensor array.

FIG. 7A shows an example top view of an implementation of an ultrasonic fingerprint sensor. FIG. 7A shows the leads connecting to the ultrasonic receiver (Rx) and the ultrasonic transmitter (Tx). FIG. 7B shows an example side view of the ultrasonic fingerprint sensor array. In the example implementation shown, the thickness of the sensor is about 500 um and the size of the sensor is about 1"×1". However, aspects of the disclosure are in no way limited by the thickness or the size shown in the illustrative figures. For example, in other implementations, the ultrasonic sensor may have a TFT sensor array with sensor pixels having about a 50 um pixel pitch, about 500 pixels per inch, and active sensor areas of 15 mm×6 mm to full display sizes, 11 mm×11 mm to 1"×1", and other sizes. Furthermore, the ultrasonic sensor may have a low profile (~1 mm or less), operating at a high operational frequency (about 5-25 MHz).

Figure 8:
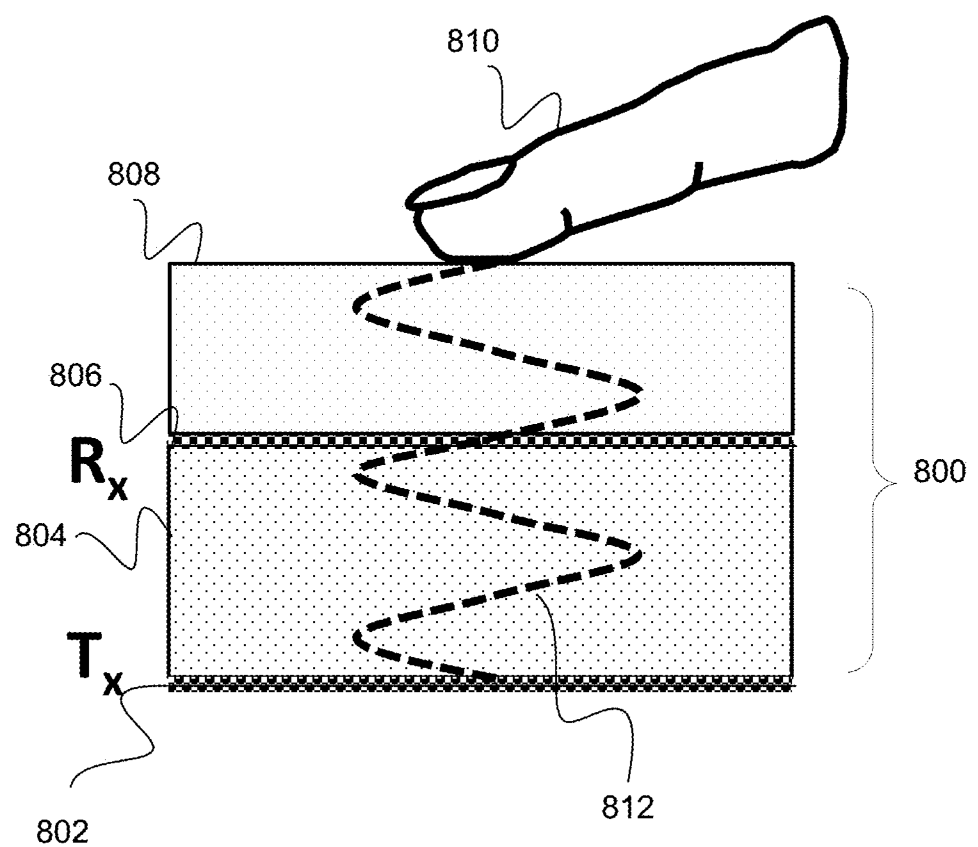
FIG. 8 illustrates a cross-sectional view of another example configuration for an ultrasonic sensor unit.

FIG. 8 illustrates a cross-sectional view of another example configuration for an ultrasonic sensor unit. FIG. 8 illustrates an ultrasonic sensor unit 800 that may have an ultrasonic transmitter (Tx) 802 at the bottom, a receiver (Rx) 806, a TFT layer 804 between the transmitter 802 and the receiver 806, and a cover layer 808 (i.e. glass or plastic), that may serve as a cover glass, cover lens or platen. Although only four layers are shown in FIG. 8 for illustration purposes, other layers (such as those illustrated with respect to FIG. 11A) may also be implemented without departing from the scope of the invention. A protective coating (not shown) may be included on the surface of the cover layer 808 to provide environmental protection and may also serve as an impedance matching layer. As described with reference to FIG. 5, the touching of an object, such as a finger 810 on the sensor surface, may change the characteristics of the standing wave signal 812, allowing for detection of the ridges and valleys of the fingerprint. Aspects of the disclosure allow for optimal image capture for ultrasonic sensors with various cover materials and cover layers of various thicknesses. For instance, the same ultrasonic sensor unit depicted in FIG. 2 may be used as the sensor in FIG. 8, with an added cover layer 808 and appropriate modifications of the excitation frequency, since the acoustic cavity may include the cover layer 808. In some implementations, the frequency of transmission from the transmitter 802 may be configured or adjusted at manufacturing or during a provisioning phase to determine an optimal resonance frequency and to operate at that frequency for improved image acquisition. Configuring or/and adjusting the frequency may account for the additional thickness added by the cover layer and/or coatings on the ultrasonic sensor (two and one-half wavelengths of the standing wave signal are shown in FIG. 8).

In some implementations, the transmitter (Tx) 802 may be formed using a silver-urethane (Ag-Ur) layer, a PVDF layer, and a second layer of Ag-Ur, with example thicknesses of 9 um, 28 um, and 9 um, respectively. The TFT layer 804 may be implemented using glass or plastic substrates and may be about 500 um in thickness. The receiver (Tx) 806 may be implemented using a layer of Ag-Ur on PVDF, having a thickness of about 9 um and 28 um, respectively. The cover layer 808, which may serve as a platen for a fingerprint sensor or as a cover glass for a display, may be a variety of different thicknesses, such as 127 um, 254 um or other suitable thickness. In addition, the ultrasonic sensor unit 800 may have a protective cover or coating that is scratch and abrasion resistant with a thickness anywhere from less than about 10 um to about 50 um or more. The cover layer 808 may have a coating disposed thereon that serves as an impedance matching layer between the cover layer 808 and a target object such as a finger 810. The total thickness for the acoustic cavity may be the sum total of the thickness for each of the layers of the ultrasonic sensor unit.

Figure 9:
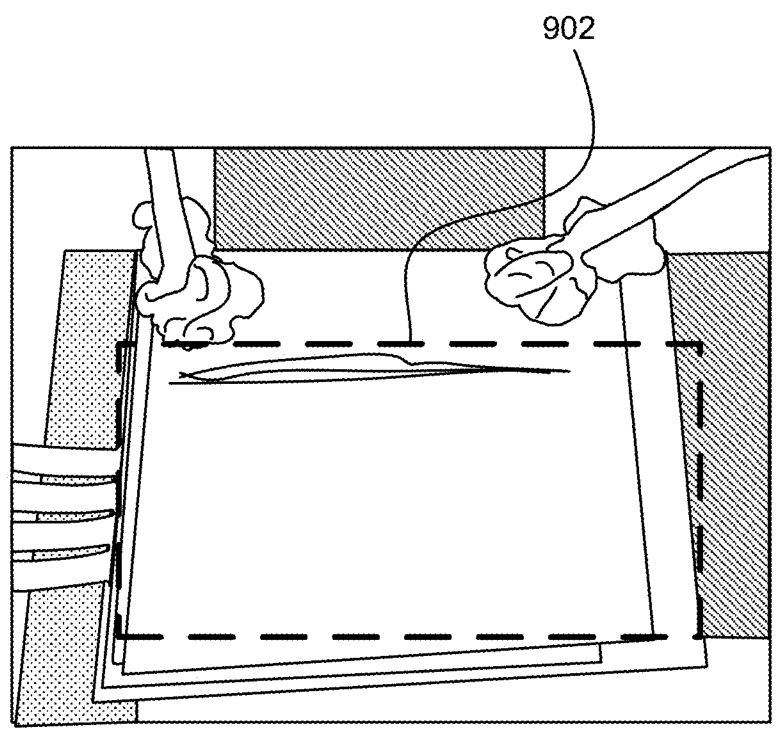
FIG. 9 shows an example ultrasonic sensor with a cover layer above the thin film transistor (TFT) substrate and receiver (Rx).

FIG. 9 shows an example ultrasonic sensor with a cover layer above the TFT substrate and receiver. In FIG. 9, the cover layer is highlighted by box 902. As discussed previously, embodiments may be adapted to account for the additional cover layer or surface coatings by adjusting the transmitter excitation frequency. Polycarbonate is shown and mentioned as only one example material that may be used as a cover layer. Other materials may be used for the cover layer such as plastic, ceramic, sapphire, composite materials, metal and metal alloys, metal-filled polymers, or glass, without departing from the invention.

As described above, embodiments of the disclosure allow for different thickness and materials for the cover layers and coatings, by adjusting the resonance frequency for the acoustic cavity. This flexibility allows the device manufacturers to provision the frequency for the ultrasonic sensor unit integrated into their systems based on various cover layers or coatings used by the manufacturers.

Figure 10A:
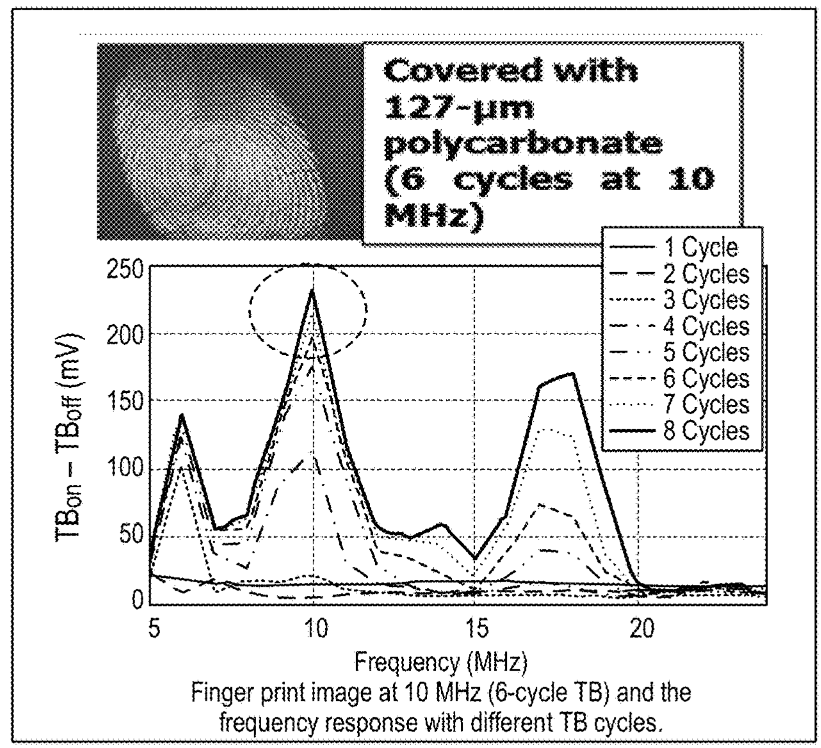
FIG. 10A and FIG. 10B illustrate graphs showing the frequency response of an example ultrasonic sensor, with different numbers of excitation signal pulses (or cycles) for two different thicknesses of polycarbonate cover layers.
Figure 10B:
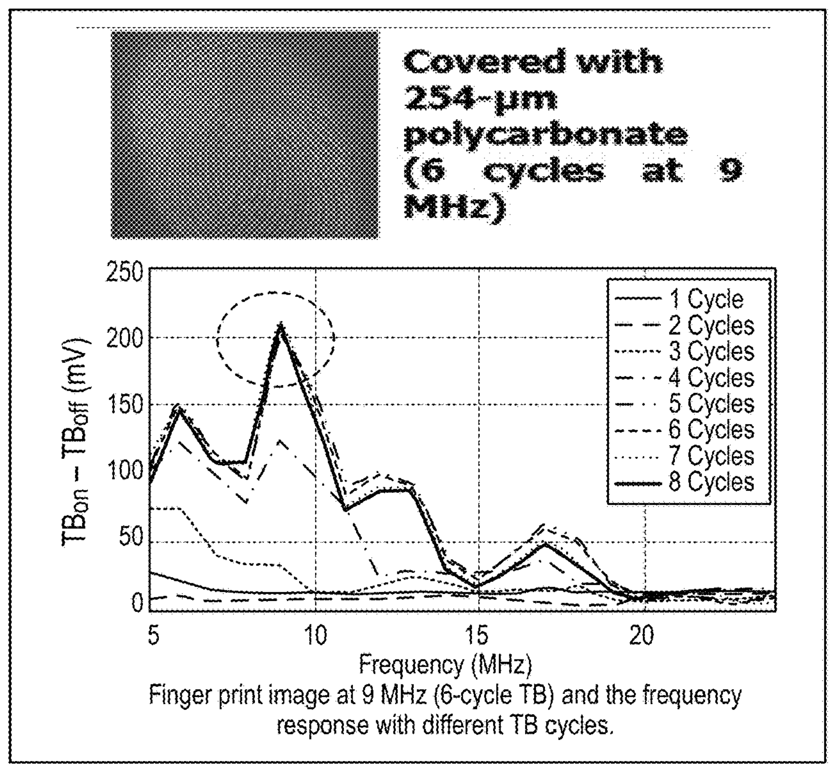

FIG. 10A and FIG. 10B illustrate graphs showing the frequency response of an example ultrasonic sensor, with different numbers of excitation signal pulses (or cycles) for two different thicknesses of polycarbonate cover layers. In FIG. 10A, the ultrasonic sensor is implemented with a 127-um thick polycarbonate cover. FIG. 10A shows a graph that has an optimal frequency for image acquisition at or around a peak frequency of about 10 MHz and a fingerprint image taken with six excitation cycles at 10 MHz.

Figure 10C:
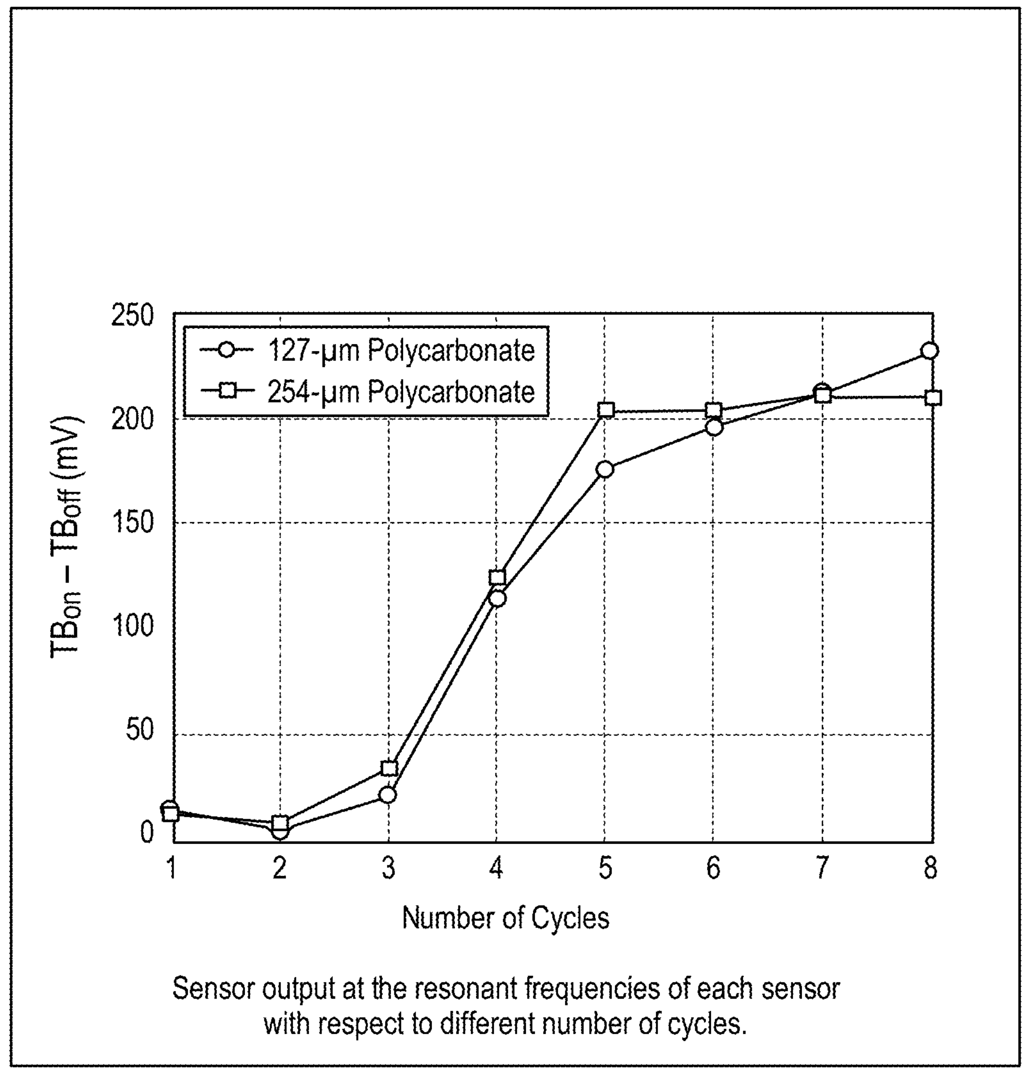
FIG. 10C illustrates differences in sensor output voltages at the resonant frequencies for the sensors represented in FIG. 10A and FIG. 10B, with respect to the different number of excitation signal pulses.

FIG. 10B has a different cover thickness than FIG. 10A. In FIG. 10B, the ultrasonic sensor is implemented with a 254-um thick polycarbonate cover layer. FIG. 10B shows a graph that has an optimal frequency for image acquisition at or around a peak frequency of about 9 MHz and a fingerprint image taken with six excitation cycles at 9 MHz. FIG. 10C illustrates differences in the sensor output voltages at the resonant frequencies for each sensor with respect to the different number of excitation signal pulses or cycles. FIGS. 10A, 10B and 10C illustrate that techniques described herein allow for cover layers and coatings with varying thicknesses over the ultrasonic sensor unit.

Figure 11A:
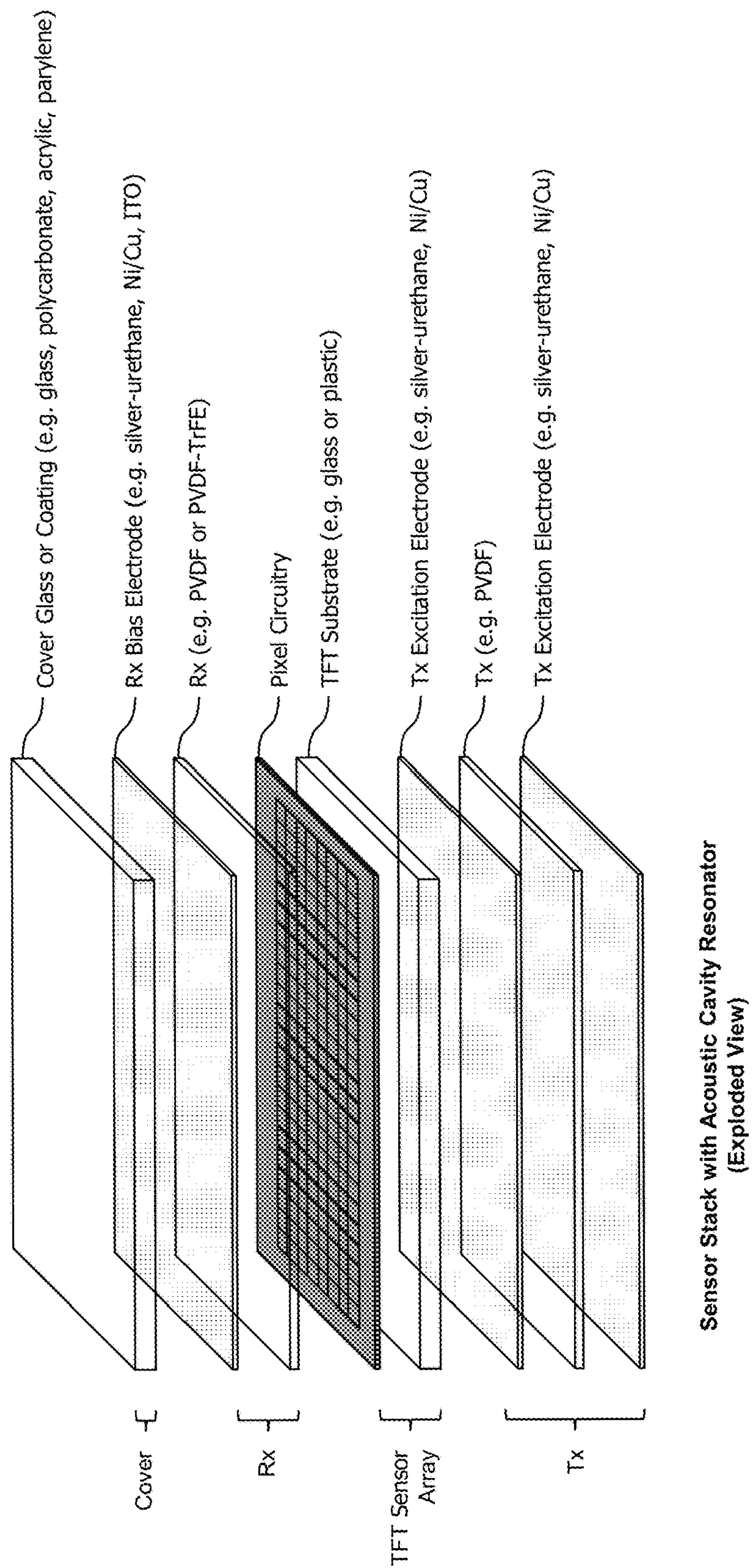
FIG. 11A illustrates an exploded view displaying various layers of a material stack for an example ultrasonic sensor unit with an acoustic cavity resonator.

FIG. 11A illustrates an exploded view displaying various layers of a material stack for an example ultrasonic sensor unit with an acoustic cavity resonator. FIG. 11A shows, top to bottom, a cover layer, a receiver layer, a TFT sensor array, and a transmitter layer. The cover layer may be a cover glass or coating (e.g., glass, polycarbonate, acrylic, parylene or any other appropriate material serving as a cover or coating). The receiver layer may have a receiver bias electrode (e.g., silver-urethane, nickel/copper (Ni/Cu), or indium tin oxide (ITO)) disposed on a piezoelectric receiver layer (e.g., polyvinylidene fluoride (PVDF) or polyvinylidene fluoride-trifluoroethylene copolymer (PVDF-TrFE)). The TFT sensor array may have pixel circuitry formed on a TFT substrate (e.g., glass or plastic), similar to circuitry shown in FIG. 13. The transmitter layer may have a transmitter electrode (e.g., silver-urethane or Ni/Cu) disposed on a piezoelectric transmitter layer (e.g., PVDF or PVDF-TrFE), and another transmitter electrode disposed on the opposing side of the piezoelectric transmitter layer. Various adhesive layers and optional coating layers have been omitted from the illustration of FIG. 11A for clarity. Furthermore, in addition to the layers shown in FIG. 11A, other layers may also be implemented without departing from the scope of the invention.

Figure 11B:
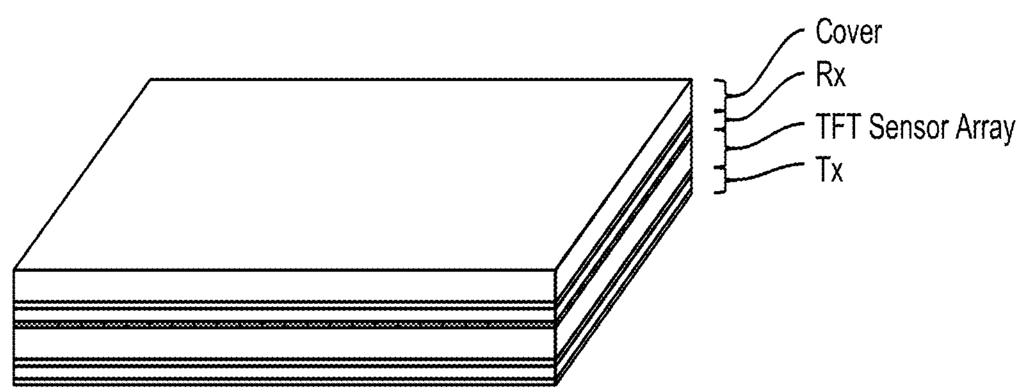
FIG. 11B illustrates an assembled view of an example ultrasonic sensor unit with an acoustic cavity.

FIG. 11B illustrates an assembled view of an example ultrasonic sensor unit with an acoustic cavity resonator. FIG. 11B shows an assembled view of the cover layer, the receiver layer, the TFT sensor array and the transmitter layer. In other configurations (not shown), an acoustic cavity resonator may be formed by stacking both the transmitter and receiver layers along with associated electrodes and adhesives between the TFT substrate and the cover layer. The transmitter may include one or more piezoelectric layers and electrodes to allow single-ended or doubled-ended drive schemes and self-shielding by grounding one or more of the transmitter electrodes. In other configurations (not shown), an acoustic cavity may be formed by placing stacked transmitter and receiver layers along with associated electrodes, adhesive layers, and coatings on top of the TFT substrate, using the TFT substrate as a semi-rigid boundary condition on one side of the stack and air on the other side that serves as a free boundary condition. In other configurations (not shown), a single-layer transmitter and receiver may be placed between the TFT substrate and a cover layer to form the acoustic resonant cavity. In other configurations (not shown), a single-layer transmitter and receiver may be placed between the TFT substrate and air to form the acoustic resonant cavity.

In at least one embodiment, a few of the key parameters for the acoustic cavity may include the thickness of and speed of sound within the various layers that form the acoustic cavity. The speed of sound, in turn, depends in part on the mass density and elastic moduli of the incorporated materials. The thickness of the acoustic cavity may depend or at least correlate to the thickness of the TFT substrate, piezoelectric layers, electrodes and adhesives (e.g., epoxy or pressure sensitive adhesive (PSA)), and any cover layers, backing layers, or coatings. The effective density of the acoustic cavity may depend or at least correlate to the density of the substrate material, piezoelectric materials, electrode and adhesive materials, and any cover or coating materials. Similarly, the effective speed of sound in the acoustic cavity may depend on the choice of substrates, piezoelectric materials, electrode materials, adhesives, and any cover or coating materials.

Figure 12A:
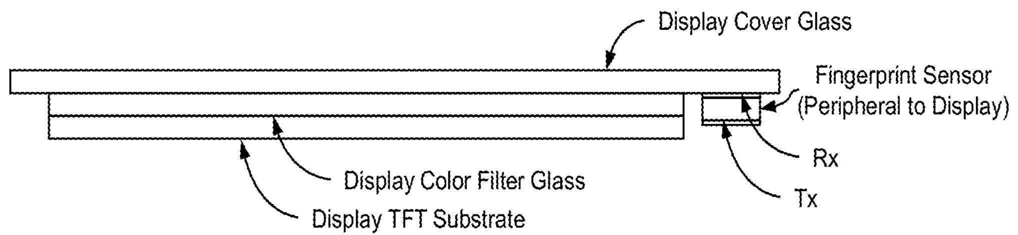
FIGS. 12A, 12B, 12C and 12D illustrate various example configurations and placements of an example ultrasonic sensor unit with a display or cover glass of a mobile device.
Figure 12B:
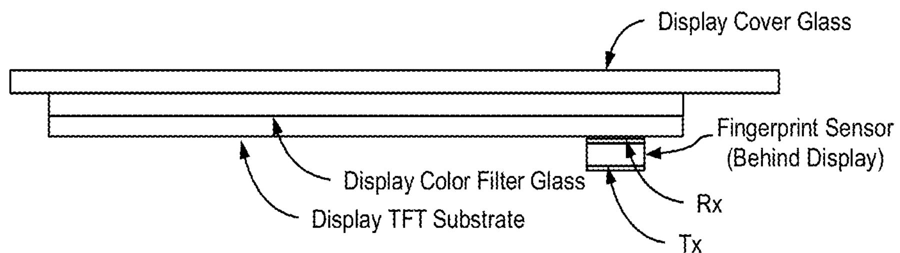
Figure 12C:
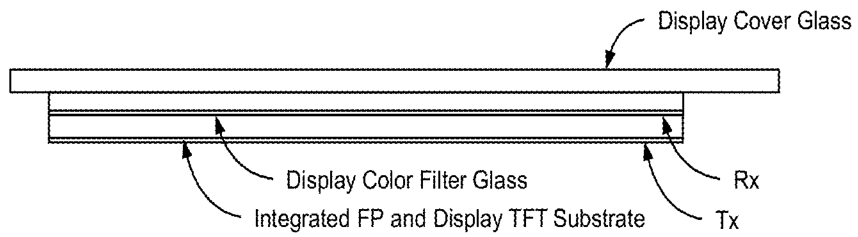
Figure 12D:
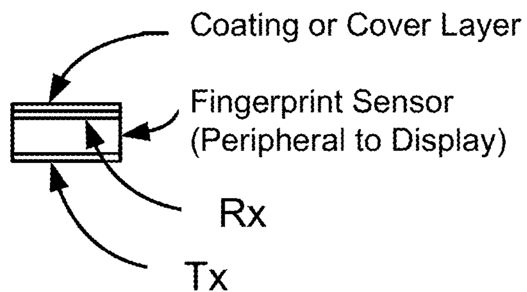

FIGS. 12A, 12B, 12C and 12D illustrate various example configurations and placements of an example ultrasonic sensor unit with a display or cover glass of a mobile device. In some implementations, the sensors may be positioned on a bezel, on the side, or on the back of a mobile device enclosure, such as the mobile device shown in FIG. 14. In some instances, the placement of the ultrasonic sensor unit may determine characteristics such as the effective thickness, density and speed of sound of the acoustic cavity. In FIG. 12A, the ultrasonic sensor unit is shown at the periphery of the enclosure with the display cover glass on top of the sensor. In FIG. 12B, the ultrasonic sensor unit is shown below the display cover glass, the display color filter glass and the display TFT substrate. In FIG. 12C, the ultrasonic sensor unit is integrated into the TFT substrate allowing for the whole screen or large portion of the screen to have ultrasonic sensing capability. In FIG. 12D, the ultrasonic sensor unit may be positioned as a stand-alone sensor outside of the display region, or as part of a button (mechanical or non-mechanical). In such cases, the enclosure of the button may additionally determine the characteristics for the acoustic cavity. In some embodiments, for an ultrasonic fingerprint sensor, the sensitivity of the sensor and density of the pixels (e.g., resolution) may be selected based on if the sensor is used for authenticating or non-authenticating purposes. Authenticating purposes, such as unlocking a mobile device or accessing an account using the fingerprint sensor, may need a higher resolution that clearly differentiates the ridges and valleys on the finger. Non-authenticating uses of the ultrasonic sensor unit may include simply pressing of a button or detection of the finger touching the surface and may allow acquisition of lower resolution images. In some implementations, the fingerprint sensor may be placed against and coupled to a metal or plastic cover of a mobile device enclosure.

FIG. 13 illustrates a block diagram for an example representation of an ultrasonic sensor unit. An example of an ultrasonic sensor unit is an ultrasonic fingerprint sensor. The ultrasonic sensor unit may have a TFT substrate that has an ultrasonic transmitter 1304 and a receiver coupled to an ultrasonic pixel circuit array 1302. The ultrasonic pixel circuit array 1302 and an overlying piezoelectric receiver layer, acting as the receiver, may be disposed on the TFT substrate. Furthermore, FIG. 13 shows the components for converting the sensor output signals from analog to digital using an analog to digital converter (ADC) 1306, selecting the appropriate pixel output signals (e.g., rows or columns) using one or more multiplexers 1308 and associated gate drivers, and a control unit 1310 and/or data processor 1312 for processing the sensor information. FIG. 13 also illustrates drivers for biasing and exciting the Rx and Tx layers of the ultrasonic sensor unit. In some implementations, the control unit 1310 and/or data processor 1312 may use the processor 1410 described in FIG. 14. In some implementations, the control unit 1310 and data processor 1312 may use an application specific integrated circuit (ASIC) or a field programmable gate array (FPGA) for processing information. In some implementations, the control unit 1310 and/or the data processor 1312 may be used for acquiring sensor output signals from the pixel circuitry, and forming or generating the image from the information obtained from the ultrasonic sensor pixel circuitry array 1302. Whereas thin-film transistors formed on glass or plastic TFT substrates have been described above, in alternative forms, a silicon substrate with transistors formed thereon or therein may be substituted without limitation for the TFT substrates throughout this disclosure.

Figure 14:
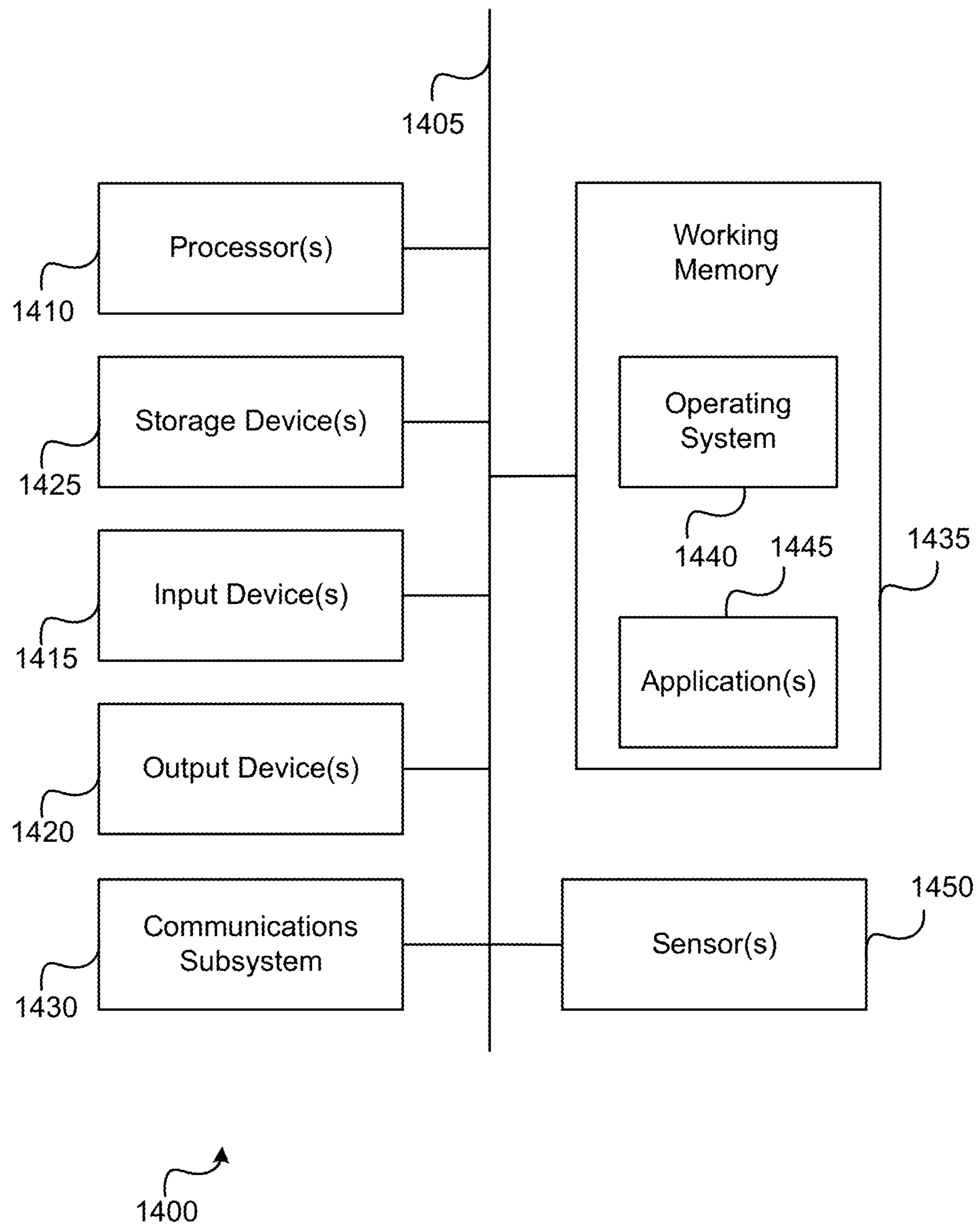
FIG. 14 illustrates an example of a computing system in which one or more embodiments may be implemented.

FIG. 14 illustrates an example computing device incorporating parts of the device employed in practicing embodiments of the invention. A computing device as illustrated in FIG. 14 may be incorporated as part of any computerized system, herein. For example, computing device 1400 may represent some of the components of a mobile device or a computing device. Examples of a computing device 1400 include, but are not limited to, desktops, workstations, personal computers, supercomputers, video game consoles, tablets, smart phones, laptops, netbooks, wearable health monitors, or other portable devices. FIG. 14 provides a schematic illustration of one embodiment of a computing device 1400 that may perform the methods provided by various other embodiments, as described herein, and/or may function as the host computing device, a remote kiosk/terminal, a point-of-sale device, a mobile multifunction device, a set-top box and/or a computing device. FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computing device 1400 is shown comprising hardware elements that may be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which may include without limitation a camera, sensor(s) 1450, a mouse, a keyboard and/or the like; and one or more output devices 1420, which may include without limitation a display unit, a printer and/or the like. Sensor(s) 1450 may include ultrasonic sensors as described herein and/or other imaging sensors. Specifically some devices may include ultrasonic fingerprint sensors. In some instances, the processing for the ultrasonic sensor may be performed by the one or more processors 1410. In another embodiment, control logic, implemented as an ASIC, FPGA or any other suitable means, may be coupled to the ultrasonic sensor unit for performing processing for the ultrasonic sensor unit. In some implementations, the computing device 1400 is a mobile device and the sensor(s) 1450 includes an ultrasonic sensor unit coupled to the mobile device.

The computing device 1400 may further include (and/or be in communication with) one or more non-transitory storage devices 1425, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computing device 1400 might also include a communications subsystem 1430. The communications subsystem 1430 may include a transceiver for receiving and transmitting data or a wired and/or wireless medium. The communications subsystem 1430 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1430 may permit data to be exchanged with a network (such as the network described below, to name one example), other computing devices, and/or any other devices described herein. In many embodiments, the computing device 1400 will further comprise a non-transitory working memory 1435, which may include a RAM or ROM device, as described above.

The computing device 1400 may comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1425 described above. In some cases, the storage medium might be incorporated within a computing device, such as computing device 1400. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 1400 and/or might take the form of source and/or installable code, which, upon compilation and/or installation on the computing device 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1400 such as network input/output devices may be employed.

Some embodiments may employ a computing device (such as the computing device 1400) to perform methods in accordance with the disclosure. For example, some or all of the procedures of the described methods may be performed by the computing device 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 1400, various computer-readable media might be involved in providing instructions/code to processor(s) 1410 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire and fiber optics, including the wires that comprise the bus 1405, as well as the various components of the communications subsystem 1430 (and/or the media by which the communications subsystem 1430 provides communication with other devices). Hence, transmission media may also take the form of waves (including without limitation radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1400. These signals, which might be in the form of electromagnetic signals, acoustic signals, optical signals and/or the like, are all examples of carrier waves on which instructions may be encoded, in accordance with various embodiments of the invention.

The communications subsystem 1430 (and/or components thereof) generally will receive the signals, and the bus 1405 then might carry the signals (and/or the data, instructions, etc. carried by the signals) to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to some embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for generating an image of a target object, comprising:

applying a plurality of excitation signal pulses to an ultrasonic transmitter of an ultrasonic sensor unit, wherein a frequency of the plurality of excitation signal pulses is selected to generate an ultrasonic standing wave inside a cover glass layer of a stack of material layers, the cover glass layer configured for contact with the target object, and wherein the plurality of excitation signal pulses are applied for a duration to allow buildup of energy for the ultrasonic standing wave over a first threshold level;

detecting a change in one or more characteristics of the ultrasonic standing wave associated with an interaction between the ultrasonic standing wave and the target object using an ultrasonic receiver of the ultrasonic sensor unit; and generating the image of the target object based on the detected change in the one or more characteristics of the ultrasonic standing wave.

2. The method of claim 1, wherein the ultrasonic standing wave results from constructive interference of generated ultrasonic wave signals with one or more reflected ultrasonic signals inside acoustic cavity.

3. The method of claim 1, wherein the change in the one or more characteristics of the ultrasonic standing wave is detected while the excitation signal pulses are being applied to the ultrasonic transmitter of the ultrasonic sensor unit.

4. The method of claim 1, wherein the change in the one or more characteristics of the ultrasonic standing wave is detected after the excitation signal pulses are applied to the ultrasonic transmitter of the ultrasonic sensor unit.

5. The method of claim 1, wherein the duration is based on passing of a reference time period.

6. The method of claim 1, wherein the duration is based on a number of the excitation signal pulses.

7. The method of claim 6, wherein the number of the excitation signal pulses is 4 pulses or more, 5 pulses or more, or 6 pulses or more.

8. The method of claim 1, wherein detecting the change in the one or more characteristics of the ultrasonic standing wave includes detecting a change in amplitude of the ultrasonic standing wave, a change in phase of the ultrasonic standing wave, or both a change in amplitude and a change in phase of the ultrasonic standing wave.

9. The method of claim 1, wherein the ultrasonic sensor unit is an ultrasonic fingerprint sensor and the target object is a finger.

10. The method of claim 9, wherein an image of the fingerprint is generated by detecting the change in the one or more characteristics of the ultrasonic standing wave by touching of a ridge of the finger to a surface of the cover glass layer of the ultrasonic sensor unit.

11. The method of claim 1, wherein the plurality of excitation signal pulses is applied using a single-ended or double-ended drive scheme electrically connected to one or more transmitter excitation electrodes associated with one or more piezoelectric layers included in the ultrasonic transmitter.

12. The method of claim 1, wherein the excitation signal pulses to generate the ultrasonic standing wave include at least one of a sinusoidal wave, a square wave, a short high-amplitude pulse, a partial-cycle wave, or a half-cycle wave.

13. An ultrasonic sensor system, comprising:

a stack of material layers including a cover glass layer, the cover glass layer configured for contact with a target object; and an ultrasonic transmitter in acoustic contact with the stack of material layers, the ultrasonic transmitter configured to receive a plurality of excitation signal pulses, wherein a frequency of the received excitation signal pulses is selected to generate an ultrasonic standing wave inside the cover glass layer and wherein the excitation signal pulses are received for a duration to allow buildup of energy in the ultrasonic standing wave over a first threshold level.

14. The ultrasonic sensor system of claim 13, wherein the selected frequency for the excitation signal pulses is based on an effective thickness of acoustic cavity, an effective density of the acoustic cavity, an effective speed of sound in the acoustic cavity, or a combination thereof.

15. The ultrasonic sensor system of claim 13, wherein the stack of material layers includes a display.

16. The ultrasonic sensor system of claim 13, wherein the cover glass layer includes a surface coating.

17. The ultrasonic sensor system of claim 13, further comprising:

an ultrasonic receiver configured to detect a change in one or more characteristics of the ultrasonic standing wave associated with an interaction between the ultrasonic standing wave and the target object; and a control unit configured to generate an image of the target object based on the detected change in the one or more characteristics of the ultrasonic standing wave.

18. The ultrasonic sensor system of claim 17, wherein the ultrasonic receiver includes an active sensor area having transistors formed on a silicon substrate, thin-film transistors (TFTs) formed on a glass or plastic substrate, or thin-film transistors integrated on a display TFT substrate.

19. The ultrasonic sensor system of claim 18, wherein the active sensor area extends across at least a portion of a display.

20. The ultrasonic sensor system of claim 13, further comprising:

an ultrasonic receiver configured to detect a change in one or more characteristics of the ultrasonic standing wave associated with an interaction between the ultrasonic standing wave and the target object, wherein the ultrasonic transmitter and the ultrasonic receiver include a single piezoelectric layer.

21. The ultrasonic sensor system of claim 20, wherein the piezoelectric layer includes a layer of polyvinylidene fluoride (PVDF) or polyvinylidene fluoride-trifluoroethylene copolymer (PVDF-TrFE).

22. The ultrasonic sensor system of claim 13, wherein the ultrasonic transmitter includes one or more piezoelectric layers and one or more transmitter excitation electrodes associated with each of the one or more piezoelectric layers.

23. The ultrasonic sensor system of claim 22, wherein the one or more piezoelectric layers and the one or more transmitter excitation electrodes are configured to allow single-ended or double-ended drive schemes.

24. The ultrasonic sensor system of claim 22, wherein the one or more piezoelectric layers and the one or more transmitter excitation electrodes are configured to allow self-shielding by grounding one or more of the transmitter excitation electrodes.

25. An ultrasonic sensor system, comprising:

means for applying a plurality of excitation signal pulses to an ultrasonic transmitter of an ultrasonic sensor unit, wherein a frequency of the excitation signal pulses is selected to generate an ultrasonic standing wave inside a cover glass layer of a stack of material layers and wherein the excitation signal pulses are applied for a duration to allow buildup of energy for the ultrasonic standing wave over a first threshold level;

means for detecting a change in one or more characteristics of the ultrasonic standing wave associated with an interaction between the ultrasonic standing wave and a target object; and means for generating an image of the target object based on the detected change in the one or more characteristics of the ultrasonic standing wave.

26. The ultrasonic sensor system of claim 25, wherein the duration is based on a number of the excitation signal pulses.

27. The ultrasonic sensor system of claim 25, wherein detecting the change in the one or more characteristics of the ultrasonic standing wave includes detecting a change in amplitude and/or phase of the ultrasonic standing wave.

28. A non-transitory computer-readable storage medium, wherein the non-transitory computer-readable storage medium comprises instructions executable by a processor to:

apply a plurality of excitation signal pulses to an ultrasonic transmitter of an ultrasonic sensor unit, wherein a frequency of the plurality of excitation signal pulses is selected to generate an ultrasonic standing wave inside a cover glass layer of the stack of material layers, the cover glass layer configured for contact with a target object, and wherein the plurality of excitation signal pulses are applied for a duration to allow buildup of energy for the ultrasonic standing wave over a first threshold level;

detect a change in one or more characteristics of the ultrasonic standing wave associated with an interaction between the ultrasonic standing wave and the target object using an ultrasonic receiver of the ultrasonic sensor unit; and generate the image of the target object based on the detected change in the one or more characteristics of the ultrasonic standing wave.

29. The non-transitory computer-readable storage medium of claim 26, wherein the duration is based on passing of a reference time period or on a number of the excitation signal pulses.

30. The non-transitory computer-readable storage medium of claim 26, wherein the instructions to detect the change in the one or more characteristics of the ultrasonic standing wave includes instructions to detect a change in amplitude and/or phase of the ultrasonic standing wave.

* * * * *

UNITED STATES PATENT AND TRADEMARK OFFICE

CERTIFICATE OF CORRECTION

PATENT NO. : 10,274,590 B2
APPLICATION NO. : 15/782750
DATED : April 30, 2019
INVENTOR(S) : Nai-Kuei Kuo et al.

It is certified that error appears in the above-identified patent and that said Letters Patent is hereby corrected as shown below:

In the Claims

In Column 21, Line 12, in Claim 2, delete “inside” and insert -- inside an --, therefor.

In Column 21, Line 12, in Claim 2, delete “cavity.” and insert -- cavity, the cover glass layer forming at least part of the acoustic cavity. --, therefor.

In Column 22, Line 3, in Claim 14, delete “thereof.” and insert -- thereof, wherein the cover glass layer forms at least part of the acoustic cavity. --, therefor.

Signed and Sealed this
Twenty-ninth Day of October, 2019

Andrei Iancu
*Director of the United States Patent and Trademark Office*